United States Patent
Fernandes et al.

(10) Patent No.: US 11,214,633 B2
(45) Date of Patent: Jan. 4, 2022

(54) ZIEGLER-NATTA CATALYST SYSTEMS AND METHODS OF CONTROLLING PARTICLE SIZE

(71) Applicant: BRASKEM AMERICA, INC., Philadelphia, PA (US)

(72) Inventors: Jonas Alves Fernandes, Pittsburgh, PA (US); George S. Ostace, Pittsburgh, PA (US); Dana Hess, Pittsburgh, PA (US)

(73) Assignee: Braskem America, Inc., Philadelphia, PA (US)

( * ) Notice: Subject to any disclaimer, the term of this patent is extended or adjusted under 35 U.S.C. 154(b) by 10 days.

(21) Appl. No.: 16/706,411

(22) Filed: Dec. 6, 2019

(65) Prior Publication Data
US 2021/0070896 A1 Mar. 11, 2021

Related U.S. Application Data

(60) Provisional application No. 62/898,207, filed on Sep. 10, 2019.

(51) Int. Cl.
*C08F 4/60* (2006.01)
*C08F 4/614* (2006.01)
(Continued)

(52) U.S. Cl.
CPC ............... *C08F 10/02* (2013.01); *C07F 7/28* (2013.01); *C08F 4/6146* (2013.01);
(Continued)

(58) Field of Classification Search
CPC .. C08F 4/6146; C08F 4/64; C07F 7/28; C07F 3/02
See application file for complete search history.

(56) References Cited

U.S. PATENT DOCUMENTS 2,843,567 A * 7/1958 Williams ............... C08G 64/30
528/371
4,178,300 A 12/1979 Van Den Berg
(Continued)

FOREIGN PATENT DOCUMENTS

BR 9203645 A 3/1994
DE 2024558 A1 * 11/1970 .............. C08F 10/00
(Continued)

OTHER PUBLICATIONS

Klaue et al., "Insight into the Synthesis Process of an Industrial Ziegler-Natta Catalyst," Ind. Eng. Chem. Res. 2019, 58, 886-896. (Published Dec. 2018).

(Continued)

*Primary Examiner* — Rip A Lee
(74) *Attorney, Agent, or Firm* — Foley & Lardner LLP

(57) ABSTRACT

A colloidal suspension includes an organic phase and a complex of Formula I as precursor for Ziegler-Natta catalyst synthesis:

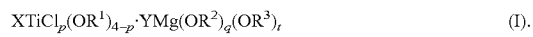

In Formula I, a molar ratio of X to Y (X/Y) is from 0.2 to 5.0, p is 0 or 1, $0<q<2$, $0<t<2$, the sum of q and t is 2, $R^1$, $R^2$, and $R^3$ are each independently a linear or branched alkyl, a linear or branched heteroalkyl, a cycloalkyl, a substituted cycloalkyl, a substituted heterocycloalkyl, a substituted aryl, or a (heteroaryl)alkyl; and $R^2$ is not the same as $R^3$.

20 Claims, 18 Drawing Sheets

(51) Int. Cl.
*C08F 4/44* (2006.01)
*C08F 10/02* (2006.01)
*C07F 7/28* (2006.01)
*C08F 110/02* (2006.01)
*C08F 4/61* (2006.01)

(52) U.S. Cl.
CPC .............. *C08F 110/02* (2013.01); *C08F 4/60* (2013.01); *C08F 4/61* (2013.01)

(56) References Cited

U.S. PATENT DOCUMENTS

| | | | |
|---|---|---|---|
| 4,442,225 A | 4/1984 | Takitani et al. | |
| 4,447,587 A | 5/1984 | Berthold et al. | |
| 4,902,761 A * | 2/1990 | Suga | C08F 10/00 526/119 |
| 4,923,935 A | 5/1990 | Sano et al. | |
| 4,935,394 A * | 6/1990 | Chang | C08F 10/00 502/104 |
| 4,972,035 A | 11/1990 | Suga et al. | |
| 5,141,910 A * | 8/1992 | Job | C08F 10/00 502/111 |
| 5,500,397 A | 3/1996 | Cuffiani et al. | |
| 5,648,309 A | 7/1997 | Bohm | |
| 6,114,271 A | 9/2000 | Bilda et al. | |
| 6,174,971 B1 | 1/2001 | Chen et al. | |
| 6,207,607 B1 * | 3/2001 | Garoff | C08F 10/00 502/127 |
| 6,545,106 B1 | 4/2003 | Bian | |
| 6,559,249 B2 | 5/2003 | Yang et al. | |
| 6,703,455 B1 * | 3/2004 | Garoff | C08F 4/651 502/116 |
| 6,864,207 B2 | 3/2005 | Knoeppel et al. | |
| 7,473,664 B2 | 1/2009 | Vizzini et al. | |
| 7,601,423 B2 | 10/2009 | Nakayama et al. | |
| 7,655,590 B2 | 2/2010 | Enriquez et al. | |
| 8,445,619 B2 | 5/2013 | Ameye et al. | |
| 9,068,025 B2 | 6/2015 | Wang et al. | |
| 9,447,207 B2 * | 9/2016 | Conti | C08F 210/16 |
| 10,351,640 B2 * | 7/2019 | Zhang | C08F 10/00 |
| 10,766,980 B2 * | 9/2020 | Smeets | C08F 4/6555 |
| 2001/0039241 A1 * | 11/2001 | Job | C08F 10/00 502/104 |
| 2005/0085601 A1 * | 4/2005 | Vizzini | C08F 10/00 526/124.3 |
| 2006/0166812 A1 * | 7/2006 | Braganca | C08F 10/02 502/103 |
| 2010/0143719 A1 | 6/2010 | Kidd et al. | |
| 2014/0350200 A1 | 11/2014 | Batinas-Geurts et al. | |
| 2017/0166734 A1 * | 6/2017 | Garg | C09D 123/0815 |
| 2018/0105621 A1 * | 4/2018 | Gupta | C08F 110/02 |

FOREIGN PATENT DOCUMENTS

| | | | |
|---|---|---|---|
| DE | 2021831 A1 * | 11/1971 | .............. C08F 10/00 |
| JP | 56-166206 A * | 12/1981 | .............. C08F 10/00 |
| JP | 11-43507 A * | 2/1999 | .............. C08F 4/658 |
| JP | 2014-181182 A * | 9/2014 | .............. C07C 31/20 |
| WO | WO-2013/098138 A1 | 7/2013 | |

OTHER PUBLICATIONS

Philippaerts et al., "Influence of the particle size of the MgCl2 support on the performance of Ziegler catalysts in the polymerization of ethylene to ultra-high molecular weight polyethylene and the resulting polymer properties," J. Polym. Sci. Part A: Polym. Chem. 2017, 55, 2679-2690.

* cited by examiner

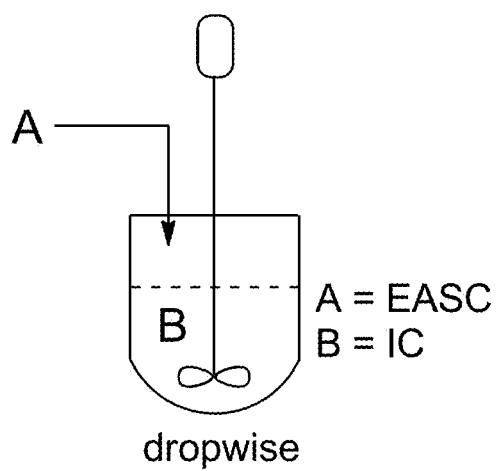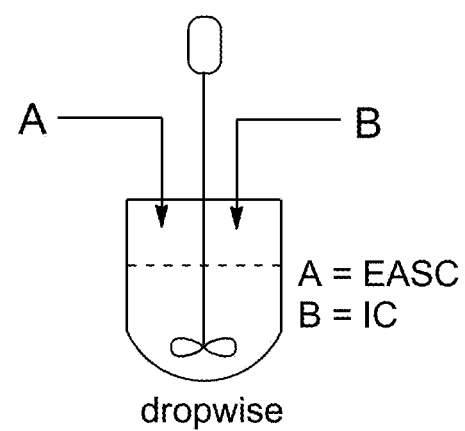
FIG. 13A
FIG. 13B

ZIEGLER-NATTA CATALYST SYSTEMS AND METHODS OF CONTROLLING PARTICLE SIZE

CROSS-REFERENCE TO RELATED APPLICATIONS

This application is a U.S. Non-Provisional Application, which claims the benefit of and priority to U.S. Provisional Application No. 62/898,207, filed Sep. 10, 2019, the contents of which is incorporated herein by reference in its entirety.

FIELD

The present technology is generally related to polyolefin catalysts. More specifically, the technology is related to Ziegler-Natta catalysts for the preparation of polyolefins.

BACKGROUND

Polyolefin, Ziegler catalysts are widely known and used for a variety of polyolefin products. For example, U.S. Pat. No. 4,447,587 describes the preparation of a solid catalyst by dropwise addition of $TiCl_4$ into a dispersion of magnesium ethylate in diesel oil. The supernatant is washed four times with diesel oil and the last washing protocol uses diesel oil to obtain the final solid pre-catalyst, which is then activated with triethylaluminum. U.S. Pat. No. 5,648,309 similarly prepares catalysts with the introduction of different transition metals. U.S. Pat. No. 4,972,035 describes the preparation of catalysts from anhydrous magnesium chloride in decane and 2-ethylhexyl alcohol to form a solution, followed by ethyl benzoate addition. The resulting solution is then added dropwise to an excess of $TiCl_4$, followed by heating. After termination of the reaction, a solid portion was collected through filtration, and washed to obtain a granular catalyst having an average particle diameter of 1.0 µm and a particle size distribution that the geometrical standard deviation was 1.2. U.S. Pat. No. 4,933,393 describes the preparation of catalysts by feeding anhydrous magnesium chloride and hexane into a reactor, adding ethanol, diethylaluminum chloride, and $TiCl_4$. A solid precipitate is then separated by filtering and washed with hexane to obtain the final catalyst as an agglomerate of fine solid particles of about 1 µm in diameter in a plurality of layers.

In other illustrative catalyst preparations, U.S. Pat. No. 6,545,106 describes the preparation of catalysts by preparing magnesium ethylate from magnesium metal with ethanol in the presence of $Ti(OBu)_4$. In the reaction, the molar ratio of titanium to magnesium is about 2. Following addition of ethyl benzoate and isobutylaluminium dichloride in hexane, a solid catalytic complex is collected. U.S. Pat. No. 6,174,971 describes the preparation of a catalyst from a slurried mixture of butyl ethyl magnesium, 2-ethylhexanol, and TiCl $(OPr^i)_3$ ($Pr^i$ is isopropyl) in hexane to obtain a clear solution. The solution may then be treated with triethylaluminum followed by addition of $TiCl_4/Ti(OBu_4)$ to form a precipitate that is then collected. The final catalyst using this recipe includes an extra impregnation step with $TiCl_4$ and a pre-contact step with triethylaluminum. European Patent No 2081969 describes the preparation of catalysts from magnesium powder in chlorobenzene with dibutyl ether, iodine, and butyl chloride, followed by contact with $(C_6H_5)SiCl_3$ and $Si(OCH_2CH_3)_4$ to form a suspension. $TiCl_4$ was then added to the suspension, and a precipitate collected. U.S. Pat. No. 9,068,025 describes the reaction of a solution of dibutyl magnesium with isooctanol to obtain a clear solution. To the solution is added a solution of polystyrene-polybutadiene triblock copolymer, followed by addition of $BCl_3$ and $TiCl_4$, in sequence, at low temperature. After bringing the temperature to 50° C., a precipitated solid is collected and washed. U.S. Pat. No. 9,587,047 describes the reaction of magnesium ethylate and $Ti(OBu)_4$ to obtain a clear liquid upon heating. After cooling and dilution with hexane to obtain a clear solution, ethyl aluminum dichloride (EADC) is added and the mixture refluxed. Upon cooling, a solid is obtained and washed.

SUMMARY

In one aspect a complex of Formula I is provided:

$$XTiCl_p(OR^1)_{4-p} \cdot YMg(OR^2)_q(OR^3)_t \qquad (I).$$

In Formula I, a molar ratio of X to Y (X/Y) is from 0.2 to 5.0; p is 0 or 1; $0<q<2$; $0<t<2$; the sum of q and t is 2; $R^2$, and $R^3$ are each independently a linear or branched alkyl, a linear or branched heteroalkyl, a cycloalkyl, a substituted cycloalkyl, a substituted heterocycloalkyl, a substituted aryl, or a (heteroaryl)alkyl; and $R^2$ is not the same as $R^3$. In some embodiments, $R^1$ may be a $C_3$-$C_6$ alkyl, $R^2$ may be $C_2$-$C_4$ alkyl, and $R^3$ may be a $C_3$-$C_6$ alkyl. In some embodiments, $R^1$ may be n-butyl, $R^2$ may be ethyl, and $R^3$ may be n-butyl. In any of the above embodiments, p may be 1. In any of the above embodiments, q may be about 1 and t may be about 1. In any of the above embodiments, X may be 0.2 to 0.5 and Y may be 0.6 to 0.8. In any of the above embodiments, the ratio of X:Y may be from 1 to 3. In any of the above embodiments, the ratio of X:Y may be about 2.

In any of the above embodiments, the complex may exhibit a $^{13}C$ NMR spectra having an alkoxide resonance from 50 ppm to 80 ppm versus tetramethylsilane. In any of the above embodiments, the complex of may exhibit a $^{13}C$ NMR spectra having an aryloxide resonance from 40 ppm to 120 ppm versus tetramethylsilane. In any of the above embodiments, a weight residue obtained by thermal gravimetric analysis (TGA) may be from 20 wt % to 35 wt %. In any of the above embodiments, the complex may exhibit a Fourier Transform Infrared C—H stretching vibration at a wavenumber from 2500 $cm^{-1}$ to 4000 $cm^{-1}$.

In another aspect, a colloidal suspension comprising an organic solvent and a complex of Formula I according to any of the above embodiments is provided. According to any embodiments, the organic solvent may include an alkane, aromatic, or a mixture of any two or more thereof. For example, the organic solvent may include n-hexane, n-pentane, cyclohexane, toluene, benzene, benzine, o-cresol, p-cresol, m-cresol, 1,2-dimethylbenzene, 1,3-dimethylbenzene, 1,4-dimethylbenzene, ethylbenzene, cumine, trichloroethylene, trichlorobenzene, o-dichlorobenzene, or a mixture of any two or more thereof.

In any of the above embodiments, the complex exhibits a multimodal domain size of a dispersed phase. In any of the above embodiments, the concentration of the Ti and Mg may be from $1 \times 10^{-5}$M to 2.0 M, as determined by inductively coupled plasma-optical emission spectrometry (ICP-OES). In any of the above embodiments, the multimodal domains may exhibit a first peak with a domain size mean from 1 nm to 10 nm in diameter, and a second peak with a domain size mean from 250 nm to 350 nm in diameter at 20° C. In any of the above embodiments, the multimodal domain size may exhibit a first peak with a domain size mean from 250 nm to 400 nm in diameter, and a second peak with a domain size mean from 4000 nm to 6000 nm in diameter at 50° C. In any of the above embodiments, the multimodal domain size may exhibit a first peak when measured by Focus Beam Reflectance Measurement (FBRM) with a cord length mean from 1 μm to 10 μm, when measured from −30° C. to 60° C.

In yet another aspect, a solid pre-catalyst system is provided that includes solid particles of a composite of a reaction product of a halogenated compound and any embodiment of the complex of Formula I, including the colloidal suspensions of the complex of Formula I, as described herein. In some embodiments, the halogenated compound includes diethyl aluminum chloride (DEAC), ethylaluminum sesquichloride (EASC), ethyl aluminum dichloride (EADC), titanium tetrachloride (TiCl$_4$), silicon tetrachloride (SiCl$_4$) or a mixture of any two or more thereof. The halogenated compounds may be in an organic solvent as described above. For example, the halogenated compound may be present in the organic solvent from about 1 to about 80 wt %, from about 5 to about 70 wt %, from about 25 to 70 wt %, or from about 40 to 60 wt %. In some embodiments, the organic solvent may include pentane, hexane, heptane, octane, and the like. In any of the above embodiments, the Ti may be present from 0.5 wt % to 30 wt %, the Mg may be present from 1 wt % to 20 wt %, the Al may be present from 1 wt % to 20 wt %, and/or the solid particles exhibit a D$_{50}$ from 1 μm to 30 μm. Any of the above embodiments, may further include an alternative Lewis acid compound.

In a further aspect, a method of polymerizing or co-polymerizing an olefin monomer is provided, the method including contacting a reducing agent with a solid pre-catalyst system that includes solid particles of a composite of a reaction product of a halogenated compound and any embodiment of the colloidal suspension of the complex of Formula I as described herein with at least one olefin monomer. In some embodiments, the olefin monomer may include ethylene, propylene, 1-butene, 4-methyl-1-pentene, 1-hexene, 1-octene, or a mixture of any two or more thereof. In any such embodiments, the solid catalyst system may exhibit an activity of greater than 2 kg$_{PE}$·g$_{Cat}^{-1}$·h$^{-1}$. In one embodiment, the olefin may be ethylene, and the method may also include collecting polyethylene exhibiting an intrinsic viscosity of greater than 1.0 dl/g. In some embodiments, reducing agents include, but are not limited to, diethyl aluminum chloride (DEAC), triethylaluminum (TEA), ethylaluminum sesquichloride (EASC), ethyl aluminum dichloride (EADC), triisobutyl aluminum (TiBA), trimethyl aluminum (TMA), methylaluminoxane (MAO), or a mixture of any two or more thereof.

In yet a further aspect, a method of forming a pre-catalyst precursor is provided, the method including contacting a titanium compound of Formula Ti(OR$^{20}$)$_4$ with TiCl$_4$ to form a reactive mixture; adding an alcohol of formula R$^{20}$OH to the reactive mixture to form a second mixture; adding a magnesium compound of Formula Mg(OR$^{21}$)$_2$ to the second mixture to form a third mixture having a molar ratio of titanium compound to magnesium compound of 0.2 to 5.0; and heating the third mixture to form a colloidal suspension of the complex of Formula I, as described herein.

In yet a further aspect, a method to prepare a solid pre-catalyst system includes the reaction of the colloidal suspension comprising an organic solvent and a complex of Formula I with a halogenated compound or a mixture of halogenated compounds.

In yet a further aspect, a method to prepare a solid pre-catalyst system includes adding the halogenated compound or a mixture of the halogenated compound into the colloidal suspension comprising an organic solvent and a complex of Formula I under controlled flow rate, temperature, concentration, and/or stirring speed.

In yet a further aspect, a method to prepare a solid pre-catalyst system includes adding the colloidal suspension comprising an organic solvent and a complex of Formula I into the halogenated compound or a mixture of the halogenated compound under controlled flow rate, temperature, concentration, and/or stirring speed.

In yet a further aspect, a method to prepare a solid pre-catalyst system includes adding simultaneously the halogenated compound or a mixture of the halogenated compound and the colloidal suspension comprising an organic solvent and a complex of Formula I into an inert liquid medium under controlled flow rate, temperature, concentration, and/or stirring speed.

BRIEF DESCRIPTION OF THE DRAWINGS

FIGS. 13A and 13B are illustrations of different reactor setups for formation of the catalysts described herein.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and may be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, the term "solution" refers to a liquid or solid phase containing more than one substance, when for convenience one (or more) substance, which is called the solvent, is treated differently from the other substances, which are called solutes. In such mixture the solute is stabilized by the solvent or simply solvated, as a result the solute may be present in a particle size of 1 nm, or less, in the largest dimension.

As used herein, the term "colloidal solution" refers to a system in which a substance or a mixture of substances form particles or domains which are regularly dispersed in a continuous phase of a different composition. In such system, the particles or domains have a size of from 1 nm to 100 nm in the largest dimension.

Figure 12:
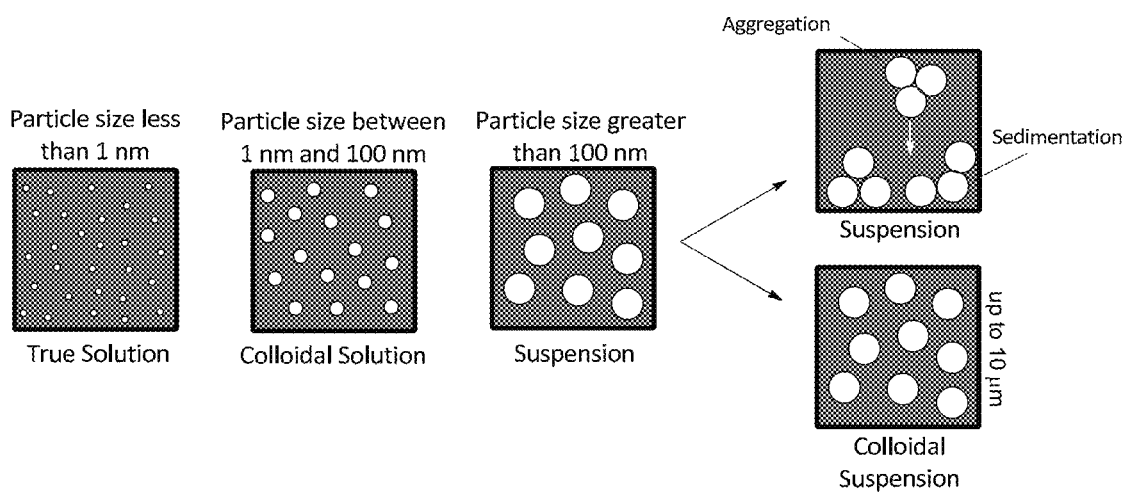
FIG. 12 includes illustrations regarding how the terms solution, colloidal solution, suspension, and colloidal suspension are used in the present application.

As used herein, the term "suspension" refers to a system in which a substance or a mixture of substances form particles or domains while dispersed in a continuous phase of a different composition (or state) having a size of greater than 100 nm in the largest dimension. At this size level aggregation of the individual particles of the material may start to form and precipitate out as sediment without the presence of any means of agitation. The particles or domains may or may not aggregate and disperse regularly in the continuous phase to form a colloidal suspension which does not precipitate or sediment without the presence of any means of agitation. Colloidal suspensions may have domains or particle sizes of from greater than 100 nm to 10 μm. Solutions, colloidal solutions, and suspensions are illustrated in FIG. 12.

In general, "substituted" refers to an alkyl, alkenyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

The definition of further substituted is expanded to also include alkylation or arylation of the underlying alkyl, aryl, heteroaryl, heterocyclyl, or cyclyl groups. This means that, e.g. an aryl group may also include alkyl groups, aryl groups, fused ring structures, and the like. This also means that general reference to the aryl group, e.g. "phenyl," includes tolyl, tert-butyl, di-tert-butyl, bi-phenyl, anthracenyl, and the like.

As used herein, "alkyl" groups include straight chain and branched alkyl groups having from 1 to about 20 carbon atoms, and typically from 1 to 12 carbons or, in some embodiments, from 1 to 8 carbon atoms. Alkyl groups may be substituted or unsubstituted. An alkyl group may be substituted one or more times. An alkyl group may be substituted two or more times. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, isopentyl groups, and 1-cyclopentyl-4-methylpentyl. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group. Heteroalkyl groups are alkyl groups containing a heteroatom.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that may further have straight or branched chain alkyl groups bonded thereto as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, ⟩CH—CH═CH$_2$, ⟩C═CH$_2$, or ⟩C═CHCH$_3$.

As used herein, "aryl", or "aromatic," groups are cyclic aromatic hydrocarbons that do not contain heteroatoms. Aryl groups include monocyclic, bicyclic, and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. An aryl group with one or more alkyl groups may also be referred to as alkaryl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

Heterocyclyl or heterocycle refers to both aromatic and nonaromatic ring compounds including monocyclic, bicyclic, and polycyclic ring compounds containing 3 or more ring members of which one or more is a heteroatom such as, but not limited to, N, O, and S. Examples of heterocyclyl groups include, but are not limited to: unsaturated 3 to 8 membered rings containing 1 to 4 nitrogen atoms such as, but not limited to pyrrolyl, pyrrolinyl, imidazolyl, pyrazolyl, pyridinyl, dihydropyridinyl, pyrimidinyl, pyrazinyl, pyridazinyl, triazolyl (e.g. 4H-1,2,4-triazolyl, 1H-1,2,3-triazolyl, 2H-1,2,3-triazolyl etc.), tetrazolyl, (e.g. 1H-tetrazolyl, 2H tetrazolyl, etc.); saturated 3 to 8 membered rings containing 1 to 4 nitrogen atoms such as, but not limited to, pyrrolidinyl, imidazolidinyl, piperidinyl, piperazinyl; condensed unsaturated heterocyclic groups containing 1 to 4 nitrogen atoms such as, but not limited to, indolyl, isoindolyl, indolinyl, indolizinyl, benzimidazolyl, quinolyl, isoquinolyl, indazolyl, benzotriazolyl; unsaturated 3 to 8 membered rings containing 1 to 2 oxygen atoms and 1 to 3 nitrogen atoms such as, but not limited to, oxazolyl, isoxazolyl, oxadiazolyl (e.g. 1,2,4-oxadiazolyl, 1,3,4-oxadiazolyl, 1,2,5-oxadiazolyl, etc.); saturated 3 to 8 membered rings containing 1 to 2 oxygen atoms and 1 to 3 nitrogen atoms such as, but not limited to, morpholinyl; unsaturated condensed heterocyclic groups containing 1 to 2 oxygen atoms and 1 to 3 nitrogen atoms, for example, benzoxazolyl, benzoxadiazolyl, benzoxazinyl (e.g. 2H-1,4-benzoxazinyl etc.); unsaturated 3 to 8 membered rings containing 1 to 3 sulfur atoms and 1 to 3 nitrogen atoms such as, but not limited to, thiazolyl, isothiazolyl, thiadiazolyl (e.g. 1,2,3-thiadiazolyl, 1,2,4-thiadiazolyl, 1,3,4-thiadiazolyl, 1,2,5-thiadiazolyl, etc.); saturated 3 to 8 membered rings containing 1 to 2 sulfur atoms and 1 to 3 nitrogen atoms such as, but not limited to, thiazolodinyl; saturated and unsaturated 3 to 8 membered rings containing 1 to 2 sulfur atoms such as, but not limited to, thienyl, dihydrodithiinyl, dihydrodithionyl, tetrahydrothiophene, tetrahydrothiopyran; unsaturated condensed heterocyclic rings containing 1 to 2 sulfur atoms and 1 to 3 nitrogen atoms such as, but not limited to, benzothiazolyl, benzothiadiazolyl, benzothiazinyl (e.g. 2H-1,4-benzothiazinyl, etc.), dihydrobenzothiazinyl (e.g. 2H-3,4-dihydrobenzothiazinyl, etc.), unsaturated 3 to 8 membered rings containing oxygen atoms such as, but not limited to furyl; unsaturated condensed heterocyclic rings containing 1 to 2 oxygen atoms such as benzodioxolyl (e.g., 1,3-benzodioxoyl, etc.); unsaturated 3 to 8 membered rings containing an oxygen atom and 1 to 2 sulfur atoms such as, but not limited to, dihydrooxathiinyl; saturated 3 to 8 membered rings containing 1 to 2 oxygen atoms and 1 to 2 sulfur atoms such as 1,4-oxathiane; unsaturated condensed rings containing 1 to 2 sulfur atoms such as benzothienyl, benzodithiinyl; and unsaturated condensed heterocyclic rings containing an oxygen atom and 1 to 2 oxygen atoms such as benzoxathiinyl. Heterocyclyl group also include those described above in which one or more S atoms in the ring is double-bonded to one or two oxygen atoms (sulfoxides and sulfones). For example, heterocyclyl groups include tetrahydrothiophene oxide and tetrahydrothiophene 1,1-dioxide. Typical heterocyclyl groups contain 5 or 6 ring members. Thus, for example, heterocyclyl groups include morpholinyl, piperazinyl, piperidinyl, pyrrolidinyl, imidazolyl, pyrazolyl, 1,2,3-triazolyl, 1,2,4-triazolyl, tetrazolyl, thiophenyl, thiomorpholinyl, thiomorpholinyl in which the S atom of the thiomorpholinyl is bonded to one or more O atoms, pyrrolyl, pyridinyl, homopiperazinyl, oxazolidin-2-onyl, pyrrolidin-2-onyl, oxazolyl, quinuclidinyl, thiazolyl, isoxazolyl, furanyl, dibenzylfuranyl, and tetrahydrofuranyl. Heterocyclyl or heterocycles may be substituted.

Heteroaryl groups are aromatic ring compounds containing 5 or more ring members, of which, one or more is a heteroatom such as, but not limited to, N, O, and S. Heteroaryl groups include, but are not limited to, groups such as pyrrolyl, pyrazolyl, triazolyl, tetrazolyl, oxazolyl, isoxazolyl, thiazolyl, pyridinyl, pyridazinyl, pyrimidinyl, pyrazinyl, thiophenyl, benzothiophenyl, furanyl, benzofuranyl, dibenzofuranyl, indolyl, azaindolyl (pyrrolopyridinyl), indazolyl, benzimidazolyl, imidazopyridinyl (azabenzimidazolyl), pyrazolopyridinyl, triazolopyridinyl, benzotriazolyl, benzoxazolyl, benzothiazolyl, benzothiadiazolyl, imidazopyridinyl, isoxazolopyridinyl, thianaphthyl, purinyl, xanthinyl, adeninyl, guaninyl, quinolinyl, isoquinolinyl, tetrahydroquinolinyl, quinoxalinyl, and quinazolinyl groups. Heteroaryl groups include fused ring compounds in which all rings are aromatic such as indolyl groups and include fused ring compounds in which only one of the rings is aromatic, such as 2,3-dihydro indolyl groups. Although the phrase "heteroaryl groups" includes fused ring compounds, the phrase does not include heteroaryl groups that have other groups bonded to one of the ring members, such as alkyl groups. Rather, heteroaryl groups with such substitution are referred to as "substituted heteroaryl groups." Representative substituted heteroaryl groups may be substituted one or more times with various substituents such as those listed above.

As used herein, the prefix "halo" refers to a halogen (i.e. F, Cl, Br, or I) being attached to the group being modified by the "halo" prefix. For example, haloaryls are halogenated aryl groups.

Groups described herein having two or more points of attachment (i.e., divalent, trivalent, or polyvalent) within the compound of the present technology are designated by use of the suffix, "ene." For example, divalent alkyl groups are alkylene groups, divalent aryl groups are arylene groups, divalent heteroaryl groups are divalent heteroarylene groups, and so forth.

It has now been surprisingly found that stable, colloidal suspensions of a Ti—Mg complex of Formula I ($XTiCl_p(OR^1)_{4-p} \cdot YMg(OR^2)_q(OR^3)_t$(I)) may be formed and used as reactant to the preparation of an efficient Ziegler-Natta catalysts for olefin polymerization reactions. The control in the composition of the Ti—Mg complex enables production of a colloidal suspension with domains and aggregates. Without being bound by theory, the aggregation and breakage of the domains appears to be driven by the surface tension of the liquid droplets, the size of which may be influenced by stirring speed, concentration, temperature, solvent medium, and the chemical composition. Therefore, the control of the dimension of the particles dispersed in the continuous phase, which seems to act as a nucleation domain during the catalyst formation, controls the catalyst particle composition and characteristics. Provided herein are the compositions, methods of making the colloidal suspensions, method of making the catalysts from the colloidal suspensions, and methods of using the catalysts in the preparation of polyolefins.

Furthermore, it has been observed that the particle size of the pre-catalyst system may be controlled by changing the addition order of the reactants. For example, by adding the halogenated compound to a colloidal suspension of a Ti—Mg complex of Formula I, compared to simultaneously adding the colloidal suspension of a Ti—Mg complex of Formula I and the halogenated compound into an inert medium, results in at least a doubling of the $D_{50}$ particle size of the obtained solid pre-catalyst particles when the stirring rate is the same. Two of the addition methods are exemplified in FIG. 13A and FIG. 13B. Methods of preparation are further described below.

In Formula I, a molar ratio of X:Y is 0.2 to 5.0, p is 0 or 1, 0<q<2, 0<t<2, the sum of q and t is 2, $R^1$, $R^2$, and $R^3$ are each independently a linear or branched alkyl, a linear or branched heteroalkyl, a cycloalkyl, a substituted cycloalkyl, a substituted heterocycloalkyl, a substituted aryl, or a (heteroaryl)alkyl; and $R^2$ is not the same as $R^3$. In some embodiments, $R^1$ may be a $C_3$-$C_6$ alkyl, $R^2$ may be $C_2$-$C_4$ alkyl, and $R^3$ may be a $C_3$-$C_6$ alkyl. One illustrative and non-limiting embodiment includes where $R^1$ is n-butyl, $R^2$ is ethyl, and $R^3$ is n-butyl. In some embodiments of Formula I, p is 1. In any such embodiments, q may be about 1 and t may be about 1. In some embodiments, X is from 0.2 to 0.5 and Y is from 0.6 to 0.8. The ratio of X:Y may vary, as noted above. For example, the ratio of X:Y may be from 1 to 3, or about 2.

Figure 1:
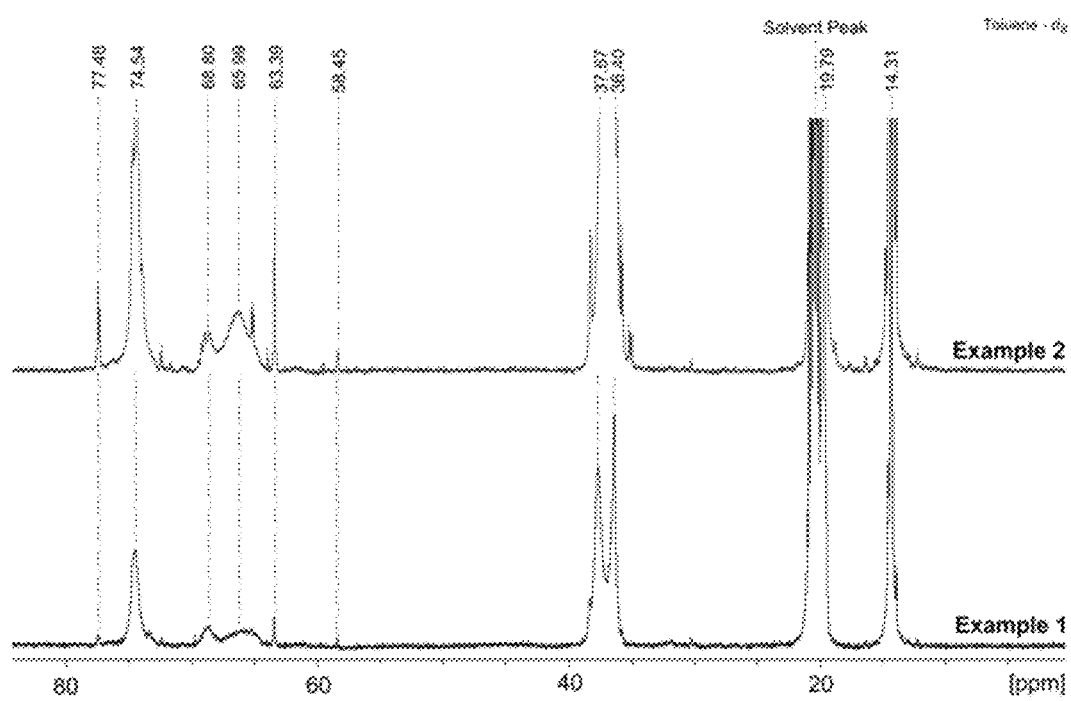
FIG. 1 is a $^{13}$C NMR spectra of dried samples of Examples 1-2.

In a carbon-13 nuclear magnetic resonance ($^{13}$C NMR) of the isolated complex of Formula I, an alkoxide resonance from 50 ppm to 80 ppm versus residual solvent signal of deuterated toluene-$d_8$ is exhibited (FIG. 1). This is indicative of the mixture of alkoxy groups derived from the Ti—Mg complex. In some embodiments, where the complex of Formula I include an aryloxide group, a $^{13}$C NMR spectra of the complex may exhibit a resonance from 40 ppm to 120 ppm versus residual solvent signal of deuterated toluene-$d_8$.

Thermal gravimetric analysis (TGA) may be used to support the characterization of the compounds by comparing actual to theoretical weight loss from a sample of the complex. In the case of the complexes of Formula I, after TGA, the weight residue obtained may be from 20 wt % to 35 wt %.

Like $^{13}$C NMR and TGA, Fourier Transform Infrared (FTIR) spectroscopy may be used to characterize the complexes. In the compositions of Formula I, the C—H stretch vibration derived from metal-oxygen-C—H may be observed using FTIR at a wavenumber from 2500 $cm^{-1}$ to 4000 $cm^{-1}$.

The colloidal suspension of the complex of Formula I may also include an organic phase. For example, the organic phase may be an alkane, aromatic, or a mixture of any two or more thereof. Illustrative examples of the organic phase include, but are not limited to, n-hexane, n-pentane, cyclohexane, toluene, benzene, benzine, o-cresol, p-cresol, m-cresol, 1,2-dimethylbenzene, 1,3-dimethylbenzene, 1,4-dimethylbenzene, ethylbenzene, cumine, trichloroethylene, trichlorobenzene, o-dichlorobenzene, or a mixture of any two or more thereof.

Interestingly, the complexes/colloidal suspensions of the complexes described herein, exhibit a multimodal domain size of a dispersed phase. As used herein a "dispersed phase" is the particles or domains that are of interest which have essentially the properties of a bulk phase of the same composition, while the "continuous" phase is different in composition. In the dispersed phase, the multimodal domain size a first peak with a domain size mean from 1 nm to 10 nm in diameter, and a second peak with a domain size mean from 250 nm to 350 nm in diameter at 20° C. This includes a multimodal domain size exhibiting a first peak with a domain size mean from 250 nm to 400 nm in diameter, and a second peak with a domain size mean from 4000 nm to 6000 nm in diameter at 50° C.

Inductively coupled plasma-optic emission spectroscopy (ICP-OES) may be used to determine the Ti and Mg concentrations in the compound of Formula I. In some embodiments, the concentration of the Ti and Mg was determined by ICP-OES to be from $1\times10^{-5}$ M to 2.0 M, as determined by ICP-OES.

One technique for determining the particle size of the complex of Formula I, Focus Beam Reflectance Measurements may be obtained (FBRM). According to FBRM, the complexes and colloidal suspensions may exhibits a first peak with a cord length mean from 1 µm to 10 µm, when measured from −30° C. to 60° C.

In another embodiment, a solid pre-catalyst system is formed from the colloidal suspension of compound of Formula I as described above, and a halogenated compound. In Formula I ($XTiCl_p(OR^1)_{4-p} \cdot YMg(OR^2)_q(OR^3)_t$), a molar ratio of X to Y (X/Y) is from 0.2 to 5.0; p is 0 or 1; 0<q<2; 0<t<2; the sum of q and t is 2; $R^1$, $R^2$, and $R^3$ are each independently a linear or branched alkyl, a linear or branched heteroalkyl, a cycloalkyl, a substituted cycloalkyl, a substituted heterocycloalkyl, a substituted aryl, or a (heteroaryl)alkyl; and $R^2$ is not the same as $R^3$. The halogenated compound may be a Lewis acid compound. Illustrative Lewis acid compounds may include one or more of diethyl aluminum chloride (DEAC), ethylaluminum sesquichloride (EASC), ethyl aluminum dichloride (EADC), titanium tetrachloride ($TiCl_4$), and silicon tetrachloride ($SiCl_4$). In the solid pre-catalyst system, the total amount of Ti may be from about 0.5 wt % to about 30 wt %. In the solid pre-catalyst system, the Mg may be present from about 1 wt % to about 20 wt %. In the solid pre-catalyst system, the Al may be present from about 1 wt % to about 20 wt %. In the solid pre-catalyst system, the solid particles exhibit a $D_{50}$ from 1 µm to 30 µm if the reaction is carried out with the addition method A (FIG. 13A) and a $D_{50}$ from 1 µm to 15 µm if the reaction is carried out with the addition method B (FIG. 13B) under similar reaction conditions.

In any of the above embodiments, the solid pre-catalyst system may include a reducing agent. Illustrative reducing agents include, but are not limited to, diethyl aluminum chloride (DEAC), triethylaluminum (TEA), ethylaluminum sesquichloride (EASC), ethyl aluminum dichloride (EADC), triisobutyl aluminum (TiBA), trimethyl aluminum (TMA), methylaluminoxane (MAO), or a mixture of any two or more thereof.

The Ziegler-Natta catalysts produced from colloidal suspensions that are described herein may be used as polymerization- or co-polymerization-catalysts for the polymerization of olefins. Accordingly, methods of using any of the pre-catalyst systems produced from the colloidal suspension in a method of polymerization are provided. The methods may include contacting a reducing agent with a solid pre-catalyst system that includes solid particles of a composite of a reaction product of a halogenated compound and a colloidal suspension of complex of Formula I (XTiCl$_p$(OR$^1$)$_{4-p}$·YMg(OR$^2$)$_q$(OR$^3$)$_r$) as embodied herein with at least one olefin monomer. A wide variety of olefins may be polymerized with the catalysts. Illustrative, non-limiting, olefins may include ethylene, propylene, 1-butene, 4-methyl-1-pentene, 1-hexene, 1-octene, or a mixture of any two or more thereof.

The catalyst efficiency ("CE") of the solid catalyst systems has been determined to be greater than 2 kg$_{PE}$·g$_{Cat}^{-1}$·h$^{-1}$. This may include from 2 kg$_{PE}$·g$_{Cat}^{-1}$·h$^{-1}$ to 50 kg$_{PE}$·g$_{Cat}^{-1}$·h$^{-1}$, and from 4 kg$_{PE}$·g$_{Cat}^{-1}$·h$^{-1}$ to 20 kg$_{PE}$·g$_{Cat}^{-1}$·h$^{-1}$.

In some embodiments of the methods, the olefin may be ethylene, and the polyethylene obtained from the method exhibits an intrinsic viscosity of greater than 1.0 dl/g. This may include from 1 dl/g to 50 dl/g, and from 5 dl/g to 40 dl/g.

In another aspect, methods of forming a catalyst composition that includes the complex of Formula I are provided. The methods include contacting a titanium compound of Formula Ti(OR$^{20}$)$_4$ with TiCl$_4$ to form a reactive mixture. Alcohol of formula R$^{20}$OH may then be added to the reactive mixture to form a second mixture. To the second mixture is then added a magnesium compound of Formula Mg(OR$^{21}$)$_2$ to form a third mixture having a molar ratio of titanium compound to magnesium compound of 0.2 to 5.0. Finally, the third mixture is heated to form a complex of Formula I, as described herein, followed by the removal of ethanol as a by-product of this reaction.

In the methods of forming, formation of the reactive mixture may conducted at, or below about ambient temperature to minimize or prevent exothermic runaway. An illustrative temperature is from about 0° C. to 40° C., from about 10° C. to about 40° C., or about 25° C. to about 30° C. Also, the heating of the third mixture is done at a temperature sufficient for the reaction to proceed and to distill the byproduct alcohol from the reaction mixture. While this temperature may vary, it is generally from about 80° C. to about 180° C. In some embodiments, the temperature is from about 100° C. to 160° C.

As an illustrative example of the method of preparation, the reactive mixture is formed by dropwise addition of TiCl$_4$ to neat Ti(OBu)$_4$ at a temperature below 30° C. with stirring and in a molar ratio of Ti(OBu)$_4$/TiCl$_4$ of about 3. In this case the TiCl$_4$ acts as chlorinating agent to the Ti(OBu)$_4$, producing TiCl(OBu)$_3$ through a radical-interexchange reaction. To this titanium compound, under an inert atmosphere and with stirring, magnesium ethoxide powder is added at molar ratio to the Ti species of 2. The mixture is then heated to 130° C. with stirring until the reaction is complete (from about 4 to 6 hours). In this step, different amounts of butanol are added resulting in a partial or completed exchange reaction with magnesium ethoxide to form magnesium butoxide or a mixture of magnesium ethoxide and butoxide allowing the formation of a clear liquid. The byproduct of this reaction (ethanol) is collected by Dean-Stark trapping. The temperature is then decreased to 100° C. and the complex is suspended in hexane to obtain a colloidal suspension with titanium concentration lower than 0.4 mol/L. During the addition of hexane the temperature is allowed to reach 60° C., where it is maintained with stirring for at least 1 hour. Afterward, the colloidal suspension is stable at room temperature.

In further aspects, the methods of preparing a solid pre-catalyst system as a polyolefin catalyst are dependent upon the reaction conditions and how the colloidal suspension is prepared. For example, in some embodiments, the method of preparing the solid pre-catalyst system includes reacting a colloidal suspension of an organic solvent and a complex of Formula I with a halogenated compound or a mixture of halogenated compounds. In the methods, the complex of Formula I is as described for any embodiment herein. In other embodiments, the method of preparing a solid pre-catalyst system includes adding a halogenated compound or a mixture of the halogenated compound into a colloidal suspension that includes an organic solvent and a complex of Formula I, under controlled flow rate, temperature, concentration, and/or stirring speed. In further embodiments, a method of preparing a solid pre-catalyst system includes adding, simultaneously, a halogenated compound (or a mixture of halogenated compounds) and a colloidal suspension that includes an organic solvent and a complex of Formula I, into an inert liquid medium under controlled flow rate, temperature, concentration, and/or stirring speed.

Figure 14:
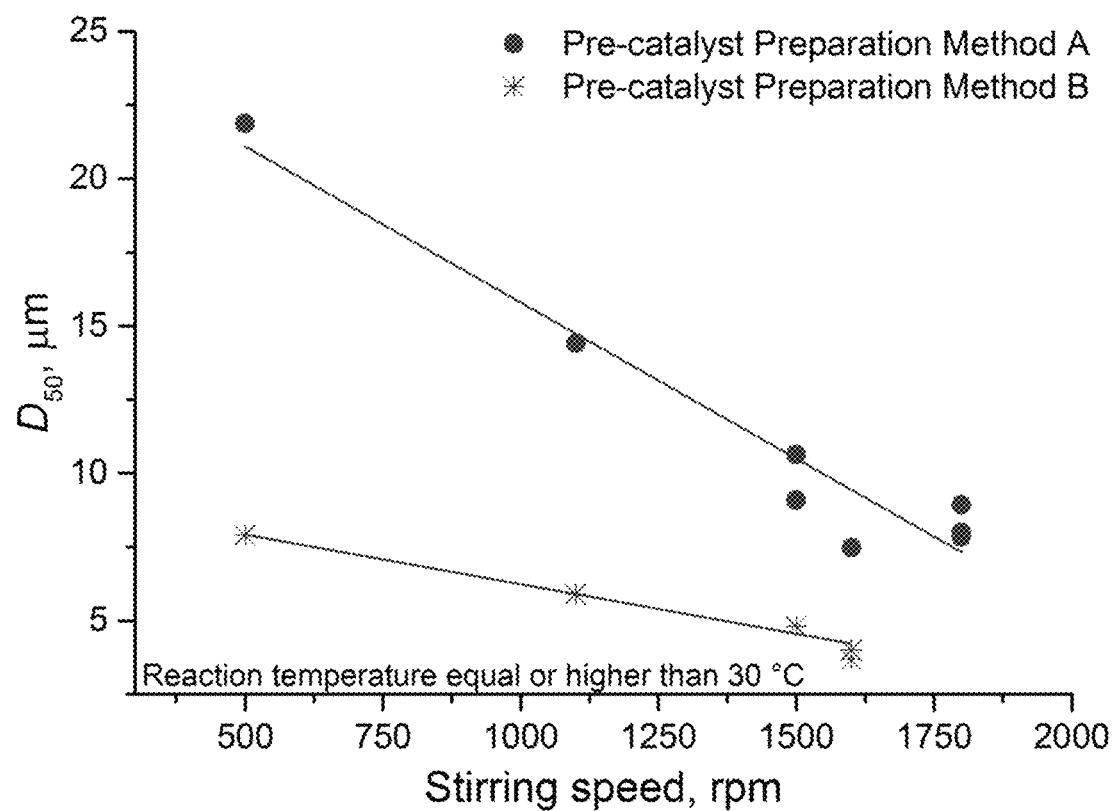
FIG. 14 is a graph of particle size (D$_{50}$) as a function of stirring rate, according to the examples.

In the methods, the compound of Formula I, the organic solvents, the colloidal suspensions, the halogenated compound(s), and the pre-catalyst systems are as described above. However, as noted, reaction conditions such as temperature, concentrations, and/or stirring speeds impact the particle size of the domains in the colloidal suspension and the solid pre-catalyst particles. As shown in FIG. 14, increasing the stirring speed from 500 to 1750 rpm decreases the D$_{50}$ value of the particle size of the pre-catalyst. In some embodiments, the stirring rate in the method is from 50 to 1800 rpm, 100 to 300 rpm, from 400 to 2500 rpm, or from 500 to 1800 rpm.

Figure 6:
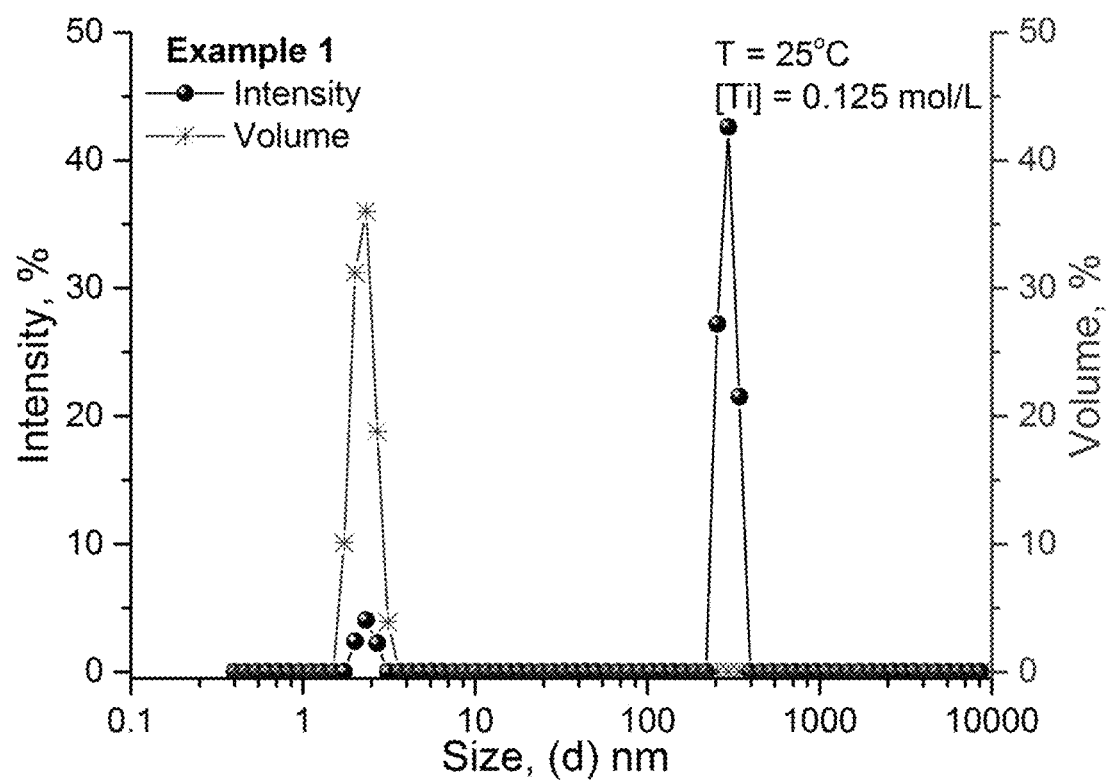
FIG. 6 is a graph of size distributions by intensity and volume of a suspension of the material of Example 1 in hexane at 25° C. and [Ti] of 0.125 mol/L, according to the Examples.
Figure 7:
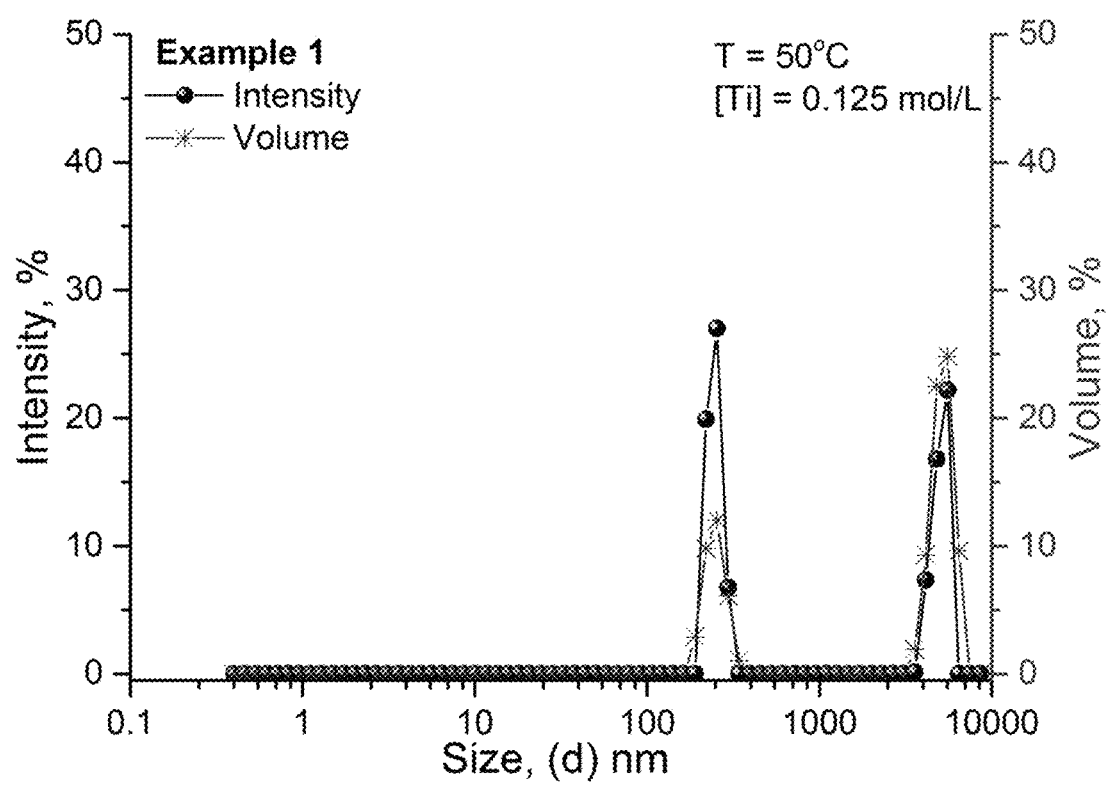
FIG. 7 is a graph of size distributions by intensity and volume of a suspension of Example 1 in hexane at 50° C. and [Ti] of 0.125 mol/L, according to the Examples.
Figure 10:
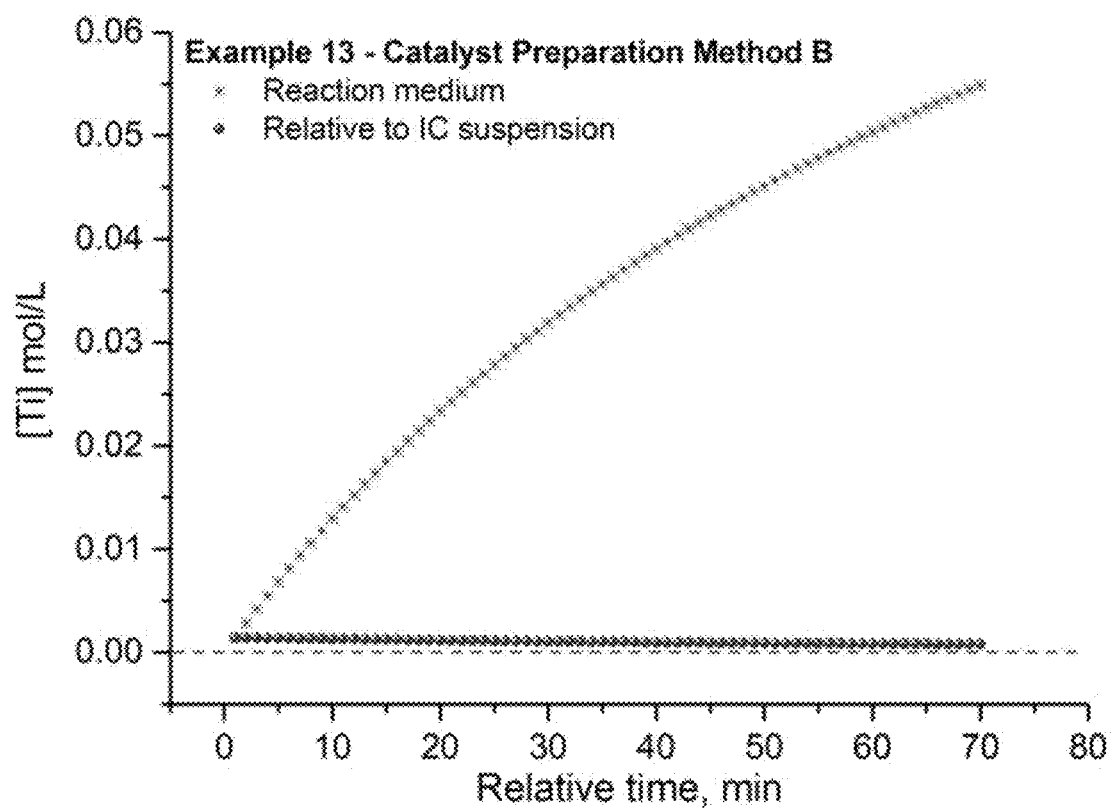
FIG. 10 is a graph of the concentration of titanium species relative to the Ti—Mg complex consumption and catalyst formation over reaction time assuming immediate conversion of the reactants, according to the Examples.
Figure 16:
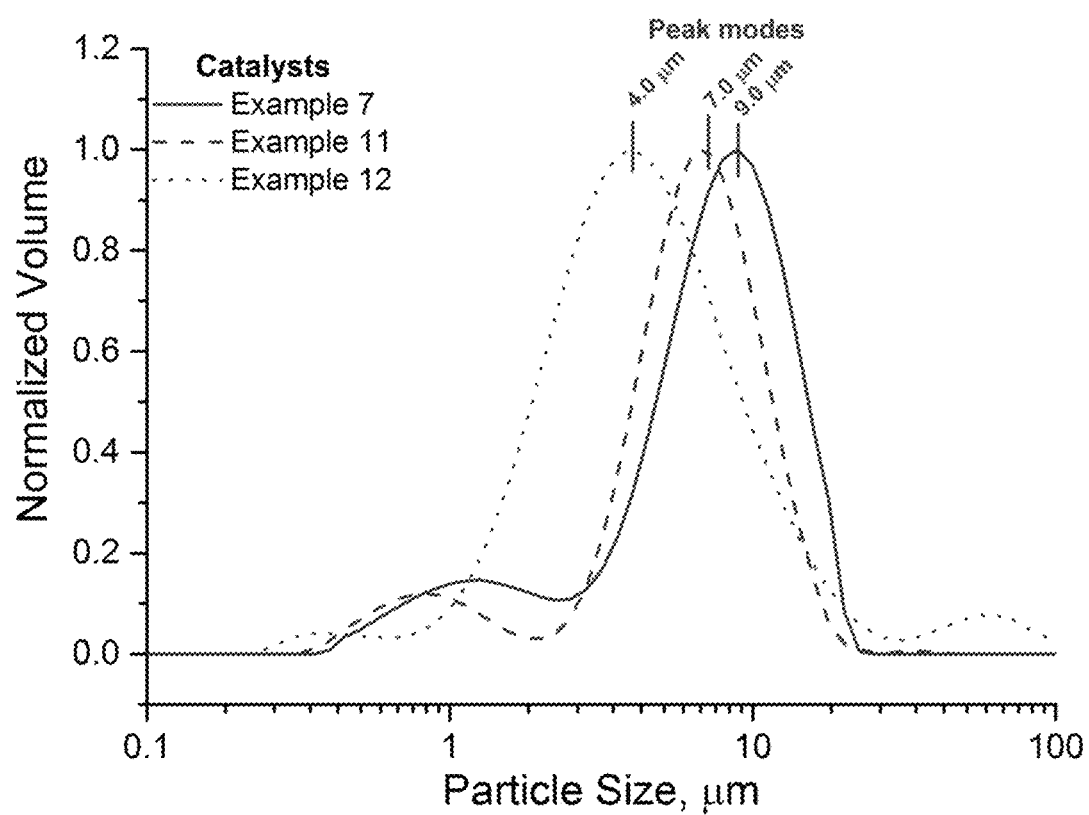
FIG. 16 is a graph of a particle size distribution measured in a Mastersizer 2000 laser diffraction particle size analyzer from Malvern Panalytical, according to the examples.

Generally, reactive precipitation processes involving chemical reactions lead to a simultaneous and fast occurrence of nucleation, crystal growth and aggregation. Thus, it may be expected that reaction conditions, such as temperature and concentration in addition to the stirring speed, may also influence the mechanisms of particle formation. As illustrated by FIG. 6-7, the lower is the temperature of the medium the smaller is the domain size in the Ti—Mg complex colloidal suspension, which could suggest better control of the nucleation domanins in a reactive precipitation process. It is also known that lower temperature in the reaction medium promotes mechanisms of nucleation and crystal growth, which results in the formation a smaller pre-catalyst particle sizes, as shown in FIG. 10. On the other hand, as particles are formed, concerns on the increase surface tension in a slurry system should also be taken in account due to the increase of cohesive forces. As shown in FIG. 16, the significant increase of the surface tension at the lowest reaction temperature suggests an important contribution from the aggregation mechanisms that broadens the particle size distribution. The contrary was observed for diluted reaction mediums due to the suppression of cohesive forces throughout the particle formation.

In the above methods, the organic solvent and/or inert liquid medium may individually include, but is not limited to, an alkane, aromatic, or a mixture of any two or more thereof. Illustrative organic solvent and/or inert liquid medium may individually include n-hexane, n-pentane, cyclohexane, toluene, benzene, benzine, o-cresol, p-cresol, m-cresol, 1,2-dimethylbenzene, 1,3-dimethylbenzene, 1,4-dimethylbenzene, ethylbenzene, cumine, trichloroethylene, trichlorobenzene, o-dichlorobenzene, or a mixture of any two or more thereof.

In the methods, the halogenated compound(s) may include, but is not limited to, diethyl aluminum chloride (DEAC), ethylaluminum sesquichloride (EASC), ethyl aluminum dichloride (EADC), titanium tetrachloride ($TiCl_4$), silicon tetrachloride ($SiCl_4$) or a mixture of any two or more thereof. In the methods, the halogenated compounds may be diluted in an organic solvent, such as those listed herein, in any embodiment. The concentration of the halogenated compound at addition may be in excess of about 5 wt %.

In the above methods, a concentration of the Ti and Mg in the colloidal suspension is from about $1 \times 10^{-5}$ M to about 2.0 M, as determined by ICP-OES.

In any of the embodiments herein, the methods may be conducted at a temperature from about −40° C. to +60° C. In any of the embodiments herein, the methods include a simultaneously feed of the halogenated compound and the colloidal suspension of a complex of Formula I at constant chloride to —$OR^x$ molar ratio, where x merely indicates the $R^1$, $R^2$, and $R^3$ groups collectively. In some embodiments the chloride to —$OR^x$ molar ratio is from about 0.1 to about 10.

In any of the embodiments herein, the resulting solid pre-catalyst from the method exhibits a Ti content from 0.5 wt % to 30 wt %, a Mg content from 1 wt % to 20 wt %, and/or an Al content from 1 wt % to 20 wt %. The solid pre-catalyst particles obtained from the method may exhibit a $D_{50}$ from about 1 µm to about 15 µm.

In any of the embodiments herein, the method may further include contacting the solid pre-catalyst system with a reducing agent. Illustrative reducing agents include, but are not limited to, diethyl aluminum chloride (DEAC), triethyl aluminum (TEA), ethylaluminum sesquichloride (EASC), ethyl aluminum dichloride (EADC), triisobutyl aluminum (TiBA), trimethyl aluminum (TMA), methylaluminoxane (MAO), or a mixture of any two or more thereof. In some embodiments, the solid pre-catalyst system may be further contacted with a reducing agent resulting in a solid catalyst system.

The present invention, thus generally described, will be understood more readily by reference to the following examples, which are provided by way of illustration and are not intended to be limiting of the present invention.

EXAMPLES

Example 1

Preparation of a colloidal suspension. Step 1: $Ti(OBu)_4$ (89.1 mL; 0.27 mol) was introduced to a 3 L glass reactor equipped with an overhead stirrer, a Dean-Stark trap, and a reflux condenser under inert atmosphere at 30° C. The reaction was followed by a dropwise addition of $TiCl_4$ (9.61 mL; 0.085 mol) while stirring at 250 rpm and maintaining the temperature under 30° C. to form a reactive mixture. Step 2: The reactive mixture was kept under these conditions for one hour, and then anhydrous n-butanol (31.0 mL, 0.34 mol) was introduced at flow rate of 15 mL/min.[1] Following completion of the n-butanol addition, $Mg(OEt)_{2(s)}$ (77.5 g, 0.68 mol) was slowly added under nitrogen. Step 3: The reaction temperature was raised to 130° C. and the stirring speed to 500 rpm. This condition was maintained for 1.5 hours followed by the collection of by-products (i.e. ethanol) via the Dean-Stark trap. Additional anhydrous n-butanol (25.0 mL, 0.27 mol) was introduced at flow rate of 15 mL/min and the reaction was kept under the same conditions for an additional 3.0 hours. Step 4: The temperature was then cooled to 100° C. with a stirring speed of 250 rpm and the Dean-Stark trap was removed under nitrogen. The temperature was set to 60° C. at the same time n-hexane (2.5 L) was added at flow rate of 25 mL/min. After the addition of hexane was complete, the intermediate complex suspension was maintained at room temperature.

<sup>Anhydrous butanol is prepared by was purchased from Aldrich as an anhydrous 1-butanol assay of 99.8%, which was then treated with 3 A molecular sieves for further removal of water.</sup>

Figure 2:
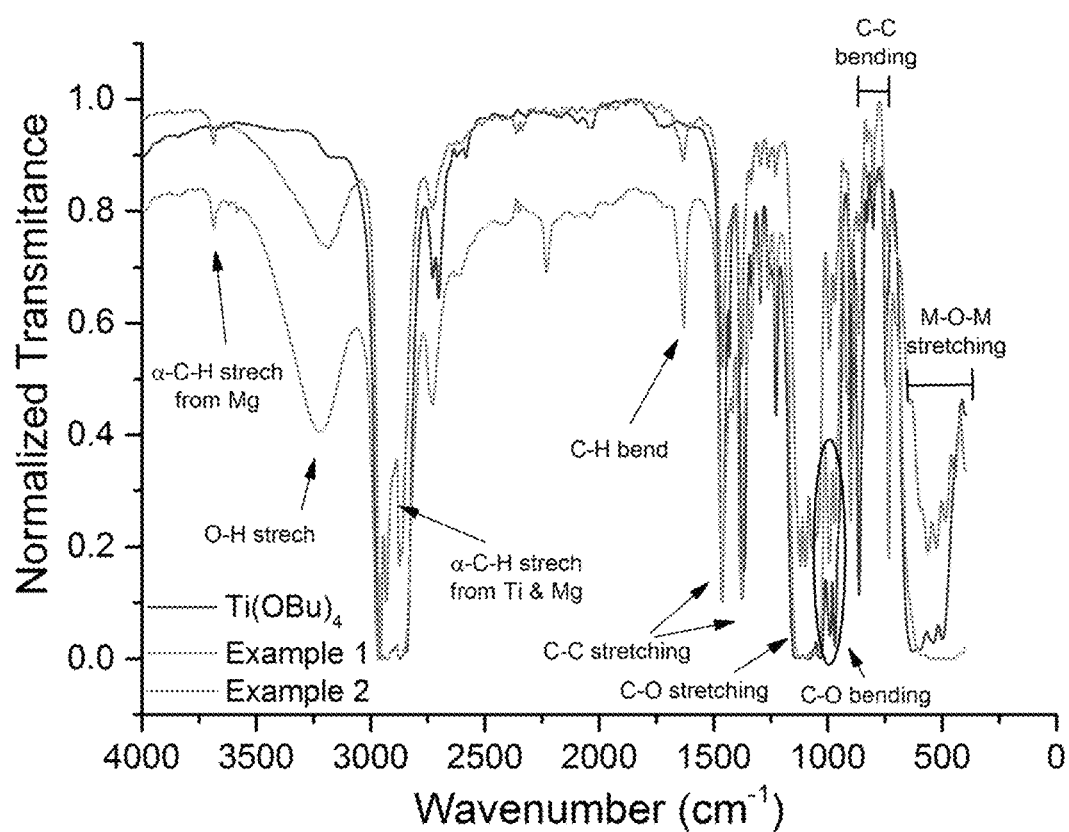
FIG. 2 is the Fourier Transform Infrared (FTIR) spectra of Example 1-2 and Ti(OBu)$_4$.

The intermediate complex solution was determined by ICP-OES to contain 0.296 M titanium and 0.618 M magnesium, which is a magnesium: titanium ratio of about 2.1. A combined 41 mL of ethanol (26 mL) and n-butanol (15 mL) were removed via the Dean-Stark trap. This amounts of ethanol and butanol were determined using $^{13}C$ NMR. Assuming complete removal of ethanol, the resultant Ti—Mg complex may have a formula of $0.36\ TiCl\ (OBu)_3 \cdot 0.72\ Mg(OEt)_{1.4}(OBu)_{0.6}$. After collection of the solids and drying, ICP-OES analysis indicated that it contained 6.39 wt % Ti and 6.56 wt % Mg, with theoretical amounts of 8.46 and 8.60, respectively. The balance of the solids are the alkoxides and halides. The FTIR spectra of the complex of Example 1 and $Ti(OBu)_4$ were obtained and are presented in FIG. 2. The spectra show characteristic α-C—H stretch vibrations bond to Mg and Ti suggesting the formation of the Ti—Mg complex.

Discussion of Example 1. In this analysis, the integral ratio between the alpha carbons of ethanol and butanol, assigned as C(b) and C(f), respectively, in FIG. 1, was used as the reference peaks. This result indicates the molar ratio between ethanol and butanol in the collected sample. By applying equation (1) is possible to estimate that approximately 26 mL of the collected sample was ethanol. Thus, assuming that most the ethanol produced in the step 2 reaction was collected, as shown in Scheme 1, it results in a molar conversion of 0.31 of the butanol-magnesium ethoxide exchange reaction.

$$\frac{\int \alpha_{C2}}{\int \alpha_{C4}} = \frac{\frac{(V_t - V_{c4}) \cdot \rho_{C2}}{M_{C2}}}{\frac{V_{C4} \cdot \rho_{C4}}{M_{C4}}} \qquad \text{Equation (1)}$$

Where, $\int \alpha_{c2\&c4}$ are the $^{13}C$ NMR integral of the alpha carbon peaks, $\rho_{c2\&C4}$ are the densities and $M_{c4\&c2}$ are the molar masses of ethanol and butanol, respectively, $V_t$ is the total volume collected in the Dean-Stark, Vc4 is the volume of butanol. Based on this information it is possible to estimate the complex composition of the Step 2 in Example 1 as shown in Scheme 2. Based upon the foregoing, the intermediate complex of Example 1 is:

0.36 TiCl(O-n-Bu)$_3$·0.72 Mg(O—Et)$_{1.4}$(O-n-Bu)$_{0.6}$.

The chemical formula is  $C_{8.06}H_{18.65}Cl_{0.36}Mg_{0.72}O_{2.52}Ti_{0.36}$ having a molecular weight of 203.46 g/mol.

Example 2

Step 1-2: Same as Example 1. Step 3: The reaction temperature was raised to 150° C. and the stirring speed to 500 rpm. This condition was maintained for 1.5 hours followed by the collection of byproducts in the Dean-Stark trap. Four extra additions of dehydrated n-butanol (4×25.0 mL, 4×0.27 mol) were then introduced at flow rate of 15 mL/min every 30 min for an additional 4.0 hours of reaction time. Step 4: Same as Example 1.

Under the conditions of Example 2, the intermediate complex solution was determined by ICP-OES to contain 0.314 M titanium and 0.618 M magnesium, which is a magnesium: titanium ratio of about 2.0. A combined 58 mL of ethanol (39 mL) and n-butanol (19 mL) were removed via the Dean-Stark trap. The intermediate complex of Example 2 is:

0.36 TiCl(O-n-Bu)$_3$·0.72 Mg(O—Et)$_{1.1}$(O-n-Bu)$_{0.9}$.

The chemical formula is $C_{8.50}H_{19.51}Cl_{0.36}Mg_{0.72}O_{2.52}Ti_{0.36}$ having a molecular weight of 209.35 g/mol. After collection of the solids and drying, ICP-OES analysis indicated that it contained 9.08 wt % Ti and 7.30 wt % Mg, with theoretical amounts of 8.20 and 8.33, respectively.

Summary of Examples 1 and 2. The intermediate complex preparation includes two main reaction steps, as shown in Scheme 1. Step 1 is an interchange reaction between titanium alkoxide and chloride to obtain a titanium alkoxy-halide complex. Step 2 is a suspension of the magnesium ethoxide into the titanium alkoxy-halide complex, which is promoted by the partial or complete exchange reaction between butanol and magnesium ethoxide to form magnesium butoxide. After formation of a uniform, suspended Ti—Mg complex, it is then allowed to suspend in an excess of hexane to reach concentrations of Ti lower than 0.4 mol/L and the suspension is maintained at 60° C. under stirring conditions for at least 1 hour before being allowed to cool to 25° C.

Scheme 1

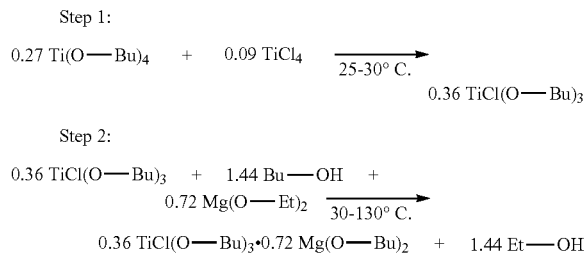

The concentration of Ti and Mg after the addition of hexane was estimated by ICP-OES. The Ti—Mg complex was suspended in approximately 2 L of hexane (1$^{st}$ dilution). The results are shown in Table 2.

TABLE 2

Metal concentration in the intermediate complex suspension in hexane by ICP-OES.

| Sample | [Ti] mol/L | [Mg] mol/L | [Mg]/[Ti] |
|---|---|---|---|
| Example 1 | 0.296 | 0.618 | 2.1 |
| Example 2 | 0.314 | 0.618 | 2.0 |

It is important to notice that the molar concentration ratio between [Mg]/[Ti] in the first dilution obtained by ICP-OES is 2.0, which is the expected result as shown in the stoichiometric coefficients in Scheme 1.

The obtained suspensions were also analyzed by thermogravimetric analysis (TGA), optical microscopy, Focused Beam Reflectance Measurement (FBRM), Dynamic Light Scattering (DLS), and Electrophoretic Light Scattering (ELS).

TGA

Figure 3:
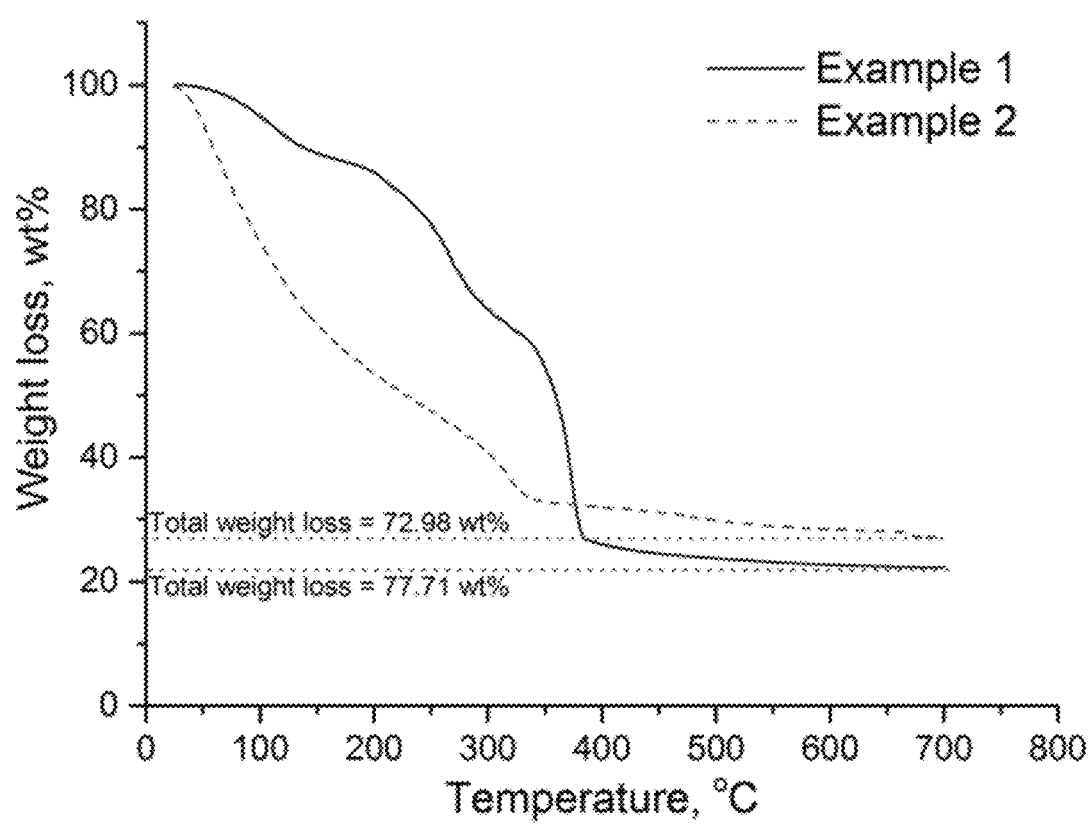
FIG. 3 is a thermogram of a dried sample of Example 1-2 under a nitrogen atmosphere and showing a theoretical weight loss of 71.61 and 72.49 wt % and a measure weight loss of 77.71 and 72.98 wt %, respectively.

Example 1 and 2 were subjected to thermogravimetric analysis assuming the decomposition product is titanium and magnesium oxide. The traces are shown in FIG. 3 for the measured weight loss of Examples 1-2. Example 1 has a theoretical weight loss of 71.61 wt % and a measured weight loss of 77.71 wt %. Example 2 has a theoretical weight loss of 72.49 wt % and a measured weight loss of 72.98 wt %.

Optical Microscopy

The Ti—Mg complex suspensions (Example 1 and 2) were transferred to a sample holder with a quartz window inside the glove box (under nitrogen) before the optical microscopy analysis. It has been observed that by increasing the content of the butoxide group in Example 2 appears to suppress the formation of aggregates in the micro-size range. As reported by D. C. Bradley (*Chem. Rev.* 89, 1317-1322 (1989)), alkoxides containing less sterically bulky groups (e.g. methyl and ethyl) proved to be oligomers (e.g. dimers, trimers, and tetramers) due to the bridging propensity of the alkoxide group, which may be bounded through its oxygen to two or three metals by means of conventional two-electron covalent bonds. Therefore, by increasing the bulkiness of the alkoxide group in Example 2 (higher content of butoxide over ethoxide), it seems to efficiently suppress the formation of large aggregates.

FBRM

The FBRM experiment is described by Yu, Z. Q. et al *Organic Process Research & Development* 2008, 12, 646:

In Focused Beam Reflectance Measurement (FBRM), a focused laser beam spinning at high speed propagates into slurry/suspension through a sapphire window mounted on the tip of a cylindrical probe. When the laser beam intersects the edge of a particle, some of it is backscattered to the detector installed in the same probe, and induces a rise signal in the circuit until it reaches the opposite edge of the particle. A chord length is thus registered. The product of risetime and tangential velocity of the spinning laser beam is a chord length. The measurement range of a chord length depends on the scanning speed of the laser beam and is divided into a fixed number of linear channels in the hardware. Each count of chord length is recorded in a corresponding channel and a chord length distribution (CLD) is thus generated. Chord length counts grouped by channels are the primary data provided by FBRM. In addition, the control interface provides a variety of weighted or unweighted statistics of the primary data, e.g. total counts of chord lengths in all channels, mean chord lengths, median standard deviation of CLD, etc., which are different statistical presentations of the primary data.

Figure 4:
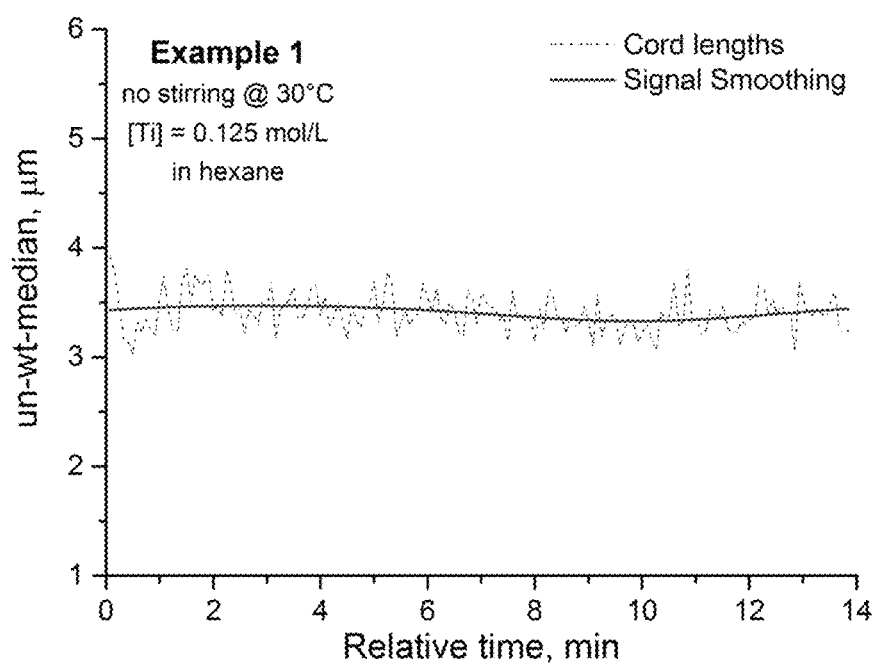
FIG. 4 is a graph of the measurement of the unweighted cord length median of a suspension of Example 1 in hexane.
Figure 5:
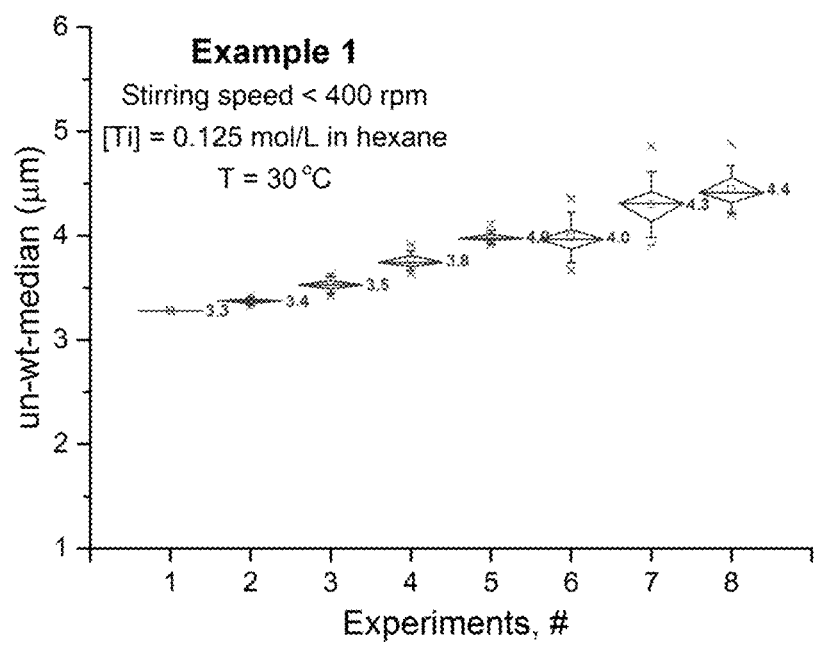
FIG. 5 is a graph of cord length unweighted median under stirring conditions (up to 400 rpm), concentration of [Ti] between 0.076-0.293 mol/L and temperature of 30° C. or 40° C., according to the Example 1.

For the FBRM measurement conducted here, 1 L jacketed reactor equipped with an overhead stirrer and a portable FBRM® G600B from Mettler-Toledo was used. The FBRM® is a real-time quantitative measurement that tracks the rate and degree of change to particles, particle structures, and droplets in a medium. The G600B wetted probe dimensions (D×L) are 19 mm×400 mm built with a Hastelloy C22 and Sapphire window. The probe temperature operation range is −10° C. to 120° C. and pressure limit of 10 bar. The intermediated complex suspension is transferred to the reactor and further diluted with hexane to reach a [Ti] of 0.125 mol/L. The mixture was then stirred at 250 rpm for 30 min at 30° C. prior the measurement. The stirring was stopped and the cord length of the particles of the material of Example 1 suspended domains in hexane was recorded as shown in FIG. 4. FIG. 5 illustrates that the suspension is stable over time at 30° C. and 40° C. without stirring.

The Ti—Mg complex suspensions were transferred to a sample holder with a quartz window inside the glove box (under nitrogen) for optical microscopy analysis.

DLS

All Dynamic Light Scattering (DLS) measurements were carried out in a Zetasizer NANO from Malvern Instruments using a quartz cell for the measurements. All the samples were prepared under inert atmosphere and the cell was capped during the measurement.

Figure 8:
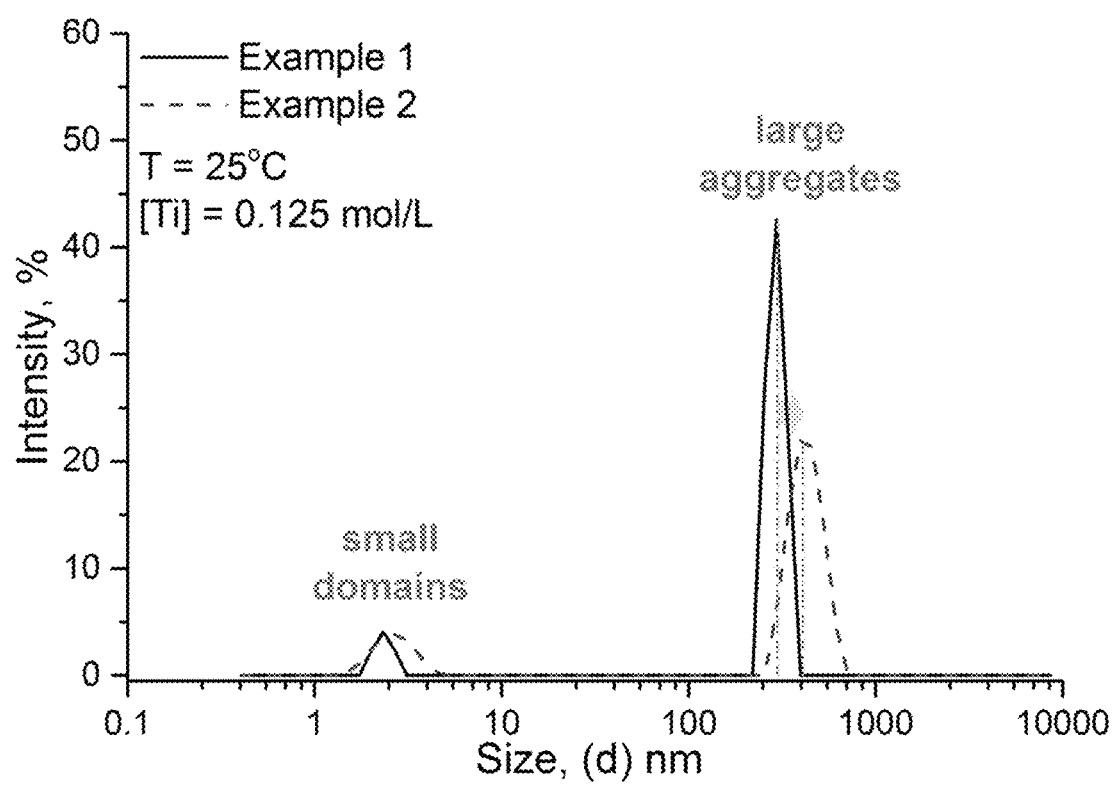
FIG. 8 is a graph of DLS results for Examples 1-2 samples under the same conditions, and which display a similar bimodal intensity distribution at 25° C.
Figure 9:
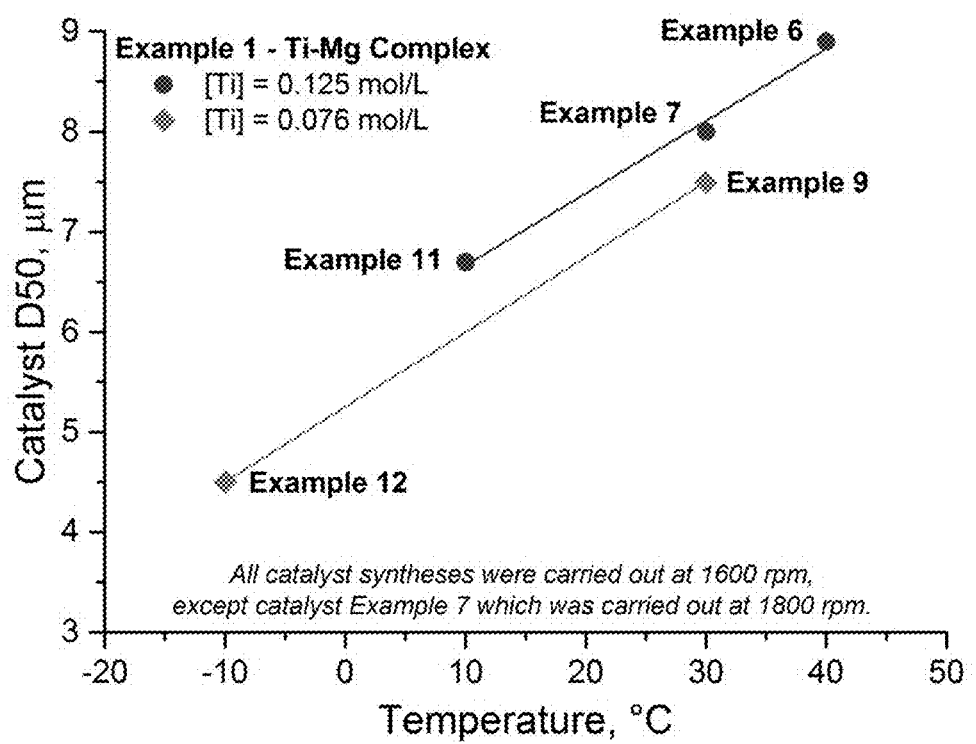
FIG. 9 is a graph illustrating the effect of reaction temperature on catalyst particle size, according to the Examples.

FIG. 6 is an illustration of the size distribution by intensity and volume of the Example 1 suspension in hexane at 25° C. and [Ti] of 0.125 mol/L. Under this condition Example 1 sample showed a bimodal particle size by intensity distribution in the ranges shown in Table 3. The conversion of this result to a volume distribution indicates that most of the distribution is in the small particle size range of 2.3 nm. On the other hand, as shown in FIG. 7, the same suspension at 50° C. displayed a bimodal intensity and volume distribution in a much higher range of particle size. These results suggest that the higher temperature induce an aggregation of the domains, which can be use as a factor to control the dimension of the dispersed phase. Furthermore, FIG. 8 showed that DLS measurements of Example 2 samples under same conditions displayed a similar bimodal intensity distribution at 25° C. It is worth noticing broadening of the distribution span and slight shift to larger particle size range when compared to Example 1 samples.

TABLE 3

Summary of DLS results of the material of Example 1 as a suspension in hexane at [Ti] = 0.125 mol/L.

| Temperature, ° C. | Peak*, nm (Intensity, %) | Peak*, nm (Volume, %) |
| --- | --- | --- |
| 25 | 2.335(8.7); 294.3(96.3) | 2.269(100); 297.5(0.0) |
| 50 | 247.2(53.6); 5057(46.4) | 249.0(31.8); 5183(68.2) |

*sizes are given in diameter

ELS

All of the Electrophoretic Light Scattering (ELS) measurements were carried out in a Zetasizer NANO from Malvern Instruments using a solvent resistance cell in a quartz cuvette.

TABLE 4

Summary of ELS results of the material of Example 1 as a suspension in hexane at [Ti] = 0.125 mol/L.

| Run, # | Zeta Potential, mV | Mobility (μmcm/V · s) |
| --- | --- | --- |
| 1 | −9.94 | −0.03697 |
| 2 | −11.4 | −0.04246 |
| 3 | −11.6 | −0.04329 |

All runs at 25° C. using hexane as dispersant. Hexane refractive index is 1.390, viscosity 0.3 cP, and dielectric constant is 1.89.

Example 3

To a 1 L glass reactor equipped with a mechanical agitator, heated jacket, and reflux condenser under inert atmosphere, 336 mL of the intermediate complex of Example 1 in hexane ([Ti]=0.296 mol/L) was added. The stirrer was set to 1500 rpm and the reactor temperature to 30° C. Under these conditions, 280.0 mL of ethyl aluminum sesquichloride (EASC) solution (50 wt % in hexane (0.47 mol)) was added at flow rate of 5.00 mL/min. The obtained slurry mixture is then allowed to heat up to 60° C. and the reactive mixture is kept at this condition for 1 hour. Before starting the washing step, the reactor temperature was reduced to 40° C. The agitation was stopped and the solid catalyst was allowed to settle at the bottom of the reactor. The supernatant was removed by cannula to a quench vessel and 500 mL of hexane was added. The slurry was stirred at 300 rpm for at least 15 min and the step was repeated at least three more times before the final catalyst slurry was transferred to a storage flask under inert atmosphere. The results are shown in Table 5.

Example 4

Similar conditions of Example 3. The differences are: (a) Intermediate Complex of Example 1 in hexane [Ti]=0.205 mol/L to produce the catalyst of this Example. The results are shown in Table 5.

Example 5

Similar conditions to Example 4 were used however, the Intermediate Complex of Example 1 in hexane [Ti]=0.125 mol/L and a stirring speed of 1700-1800 rpm were used to produce the catalyst. The results are shown in Table 5.

Example 6

Similar conditions to Example 5 were used, however a stirring speed of 1800 rpm, a reaction temperature of 40° C., and an EASC flow rate of 1-2 mL/min were used. The results are shown in Table 5.

Example 7

Similar conditions to Example 6 were used, however the reaction temperature was 30° C. The results are shown in Table 5.

Example 8

Similar conditions to Example 7 were used, however the reaction temperature was 60° C., and a stirring speed of 500 rpm was used. The results are shown in Table 5.

Example 9

Similar conditions to Example 7 were used, however the Intermediate Complex of Example 1 in hexane [Ti]=0.076 mol/L, a reaction temperature of 30° C., a stirring speed of 1600 rpm, and a EASC volume of 140 mL were used. The results are shown in Table 5.

Example 10

Similar conditions to Example 7 were used, however a stirring speed of 1100 rpm was used. The results are shown in Table 5.

Example 11

Similar conditions to Example 9 were used, however the Intermediate Complex of Example 1 in hexane [Ti]=0.125 mol/L, a reaction temperature of 10° C., and an EASC volume of 280 mL were used. The results are shown in Table 5.

Example 12

Similar conditions to Example 11 were used, however the Intermediate Complex of Example 1 in hexane [Ti]=0.076 mol/L, a reaction temperature of −10° C. and an EASC volume of 140 mL were used.

Example 13

Similar conditions to Example 12 were used, however the Intermediate Complex of Example 2 in hexane [Ti]=0.076 mol/L was used. The results are shown in Table 5. FIG. 16 illustrates the particle size distribution measured in a Mastersizer 2000 laser diffraction particle size analyzer from Malvern Panalytical, for Examples 7, 11, and 12.

Note that in each of Examples 3-13, a setup as illustrated in FIG. 13A was used.

Example 15

Similar conditions to Example 14 were used, however the Intermediate Complex of Example 2 in hexane [Ti]=0.314 mol/L and stirring condition of 1100 rpm were used. The results are shown in Table 6.

Example 16

Similar conditions to Example 15 were used, however the stirring condition of 500 rpm was used. The results are shown in Table 6.

Example 17

Similar conditions to Example 15 were used, however the stirring condition of 1500 rpm was used. The results are shown in Table 6.

TABLE 5

Summary of catalyst synthesis conditions.

| Example | Ti—Mg complex suspension $(mol_{Ti}/L)^b$ | Stirring Speed (rpm) | T (° C.)$^d$ | Volume (L) | EASC$^e$ Flow rate (ml/min) | —Cl/—OR mol/mol |
|---|---|---|---|---|---|---|
| 3 | 0.293 | 1500 | 30 | 0.28 | 5 | 2.9 |
| 4 | 0.205 | 1500 | 30 | 0.28 | 5 | 3.7 |
| 5 | 0.125 | 1700-1800$^c$ | 30 | 0.23 | 5 | 5.0 |
| 6 | 0.125 | 1800 | 40 | 0.23 | 1-2$^f$ | 5.0 |
| 7 | 0.125 | 1800 | 30 | 0.23 | 1-2$^f$ | 5.0 |
| 8 | 0.125 | 500 | 60 | 0.23 | 1-2 | 5.0 |
| 9 | 0.076 | 1600 | 30 | 0.14 | 1-2 | 5.0 |
| 10 | 0.125 | 1100 | 30 | 0.23 | 1-2 | 5.0 |
| 11 | 0.125 | 1600 | 10 | 0.23 | 1-2 | 5.0 |
| 12 | 0.076 | 1600 | −10 | 0.14 | 1-2 | 5.0 |
| 13$^a$ | 0.076 | 1600 | −10 | 0.14 | 1-2 | 5.0 |

$^a$Intermediate complex 2 was used in this experiment;
$^b$Ti-Mg complex suspension volume used in the preparation of Examples 3-5 was 0.335 L and Examples 6-13 was 0.37 L;
$^c$stirring speed was increased after 35 min of reaction relative to the start of EASC transfer;
$^d$temperature during the addition of EASC;
$^e$50 wt % solution in hexane; flow rate increased after 80 min of reaction relative to the start of EASC transfer.

Example 14

275 mL of hexane was transferred to 1L glass reactor equipped with a mechanical agitator, heated jacket, and reflux condenser under inert atmosphere. The stirrer was set to 1600 rpm and the reactor temperature to 30° C. Under these conditions was fed to the reactor simultaneously 95 mL of the Intermediate Complex of Example 1 in hexane ([Ti]=0.296 mol/L) at 1.35 mL/min and 140.0 mL of ethyl aluminum sesquichloride (EASC) solution (50 wt % in hexane (0.235 mol)) at flow rate of 2.00 mL/min. The obtained slurry mixture is then allowed to heat up to 60° C. and the reactive mixture was kept at this condition for 1 hour. Before starting the washing step, the reactor temperature was reduced to 40° C. The agitation was stopped and the solid catalyst was allowed to settle at the bottom of the reactor. The supernatant was removed by cannula to a quench vessel, and 500 mL of hexane was added. The slurry was stirred at 300 rpm for at least 15 min and the step was repeated at least three more times before the final catalyst slurry was transferred to a storage flask under inert atmosphere. The results are shown in Table 6.

Example 18

Similar conditions to Example 15 were used, however the stirring condition of 1600 rpm was used. The results are shown in Table 6.

Figure 11:
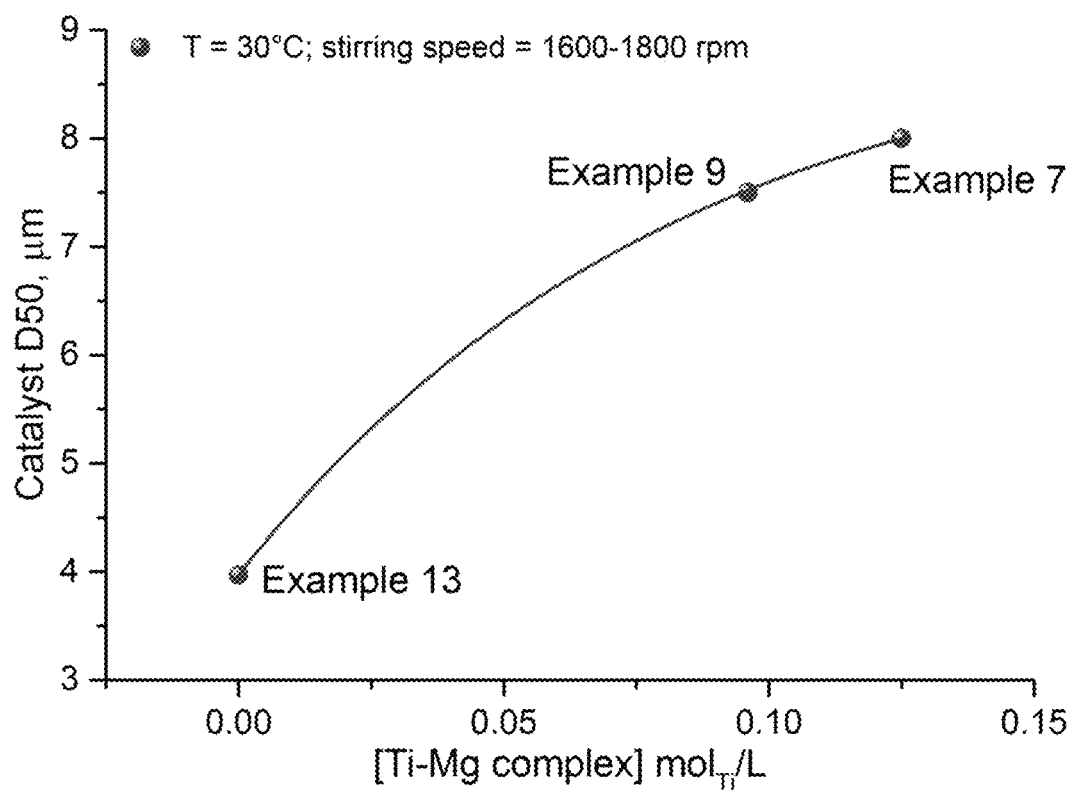
FIG. 11 is a graph illustrating the effect of Ti—Mg complex concentration on the catalyst particle size, according to the Examples.

Therefore, two different methods for catalyst preparation were explored in the examples above. Examples 3-13 use the addition of the halogenated compound (EASC) into the Ti—Mg suspension as shown in FIG. 13A. Differently, examples 14-18 use the co-addition of the halogenated compound (EASC) and Ti—Mg complex suspension into a specific volume of hexane to enable mixing conditions, as shown in FIG. 13B. Note that by the catalyst preparation method B (co-addition) the concentration of Ti derived from the Ti—Mg complex is rapidly consumed over the reaction time, as exemplified in FIG. 10. As a result of this approach, a more pronounced dilution effect to the catalyst particle size formation can be observed, as shown in FIG. 11.

TABLE 6

Summary of catalyst synthesis conditions.

| | Reactor Conditions | | | IC | | | EASC | |
|---|---|---|---|---|---|---|---|---|
| Example | Hexane (L) | Stirring Speed (rpm) | T (° C.) | [Ti] (mol/L) | Volume (L) | Flow rate (ml/min) | Volume (L) | Flow rate (ml/min) |
| 14 | 0.275 | 1600 | 30 | 0.296 | 95 | 1.35 | 0.14 | 2.0 |
| 15 | 0.275 | 1100 | 30 | 0.314 | 95 | 1.35 | 0.14 | 2.0 |
| 16 | 0.275 | 500 | 30 | 0.314 | 95 | 1.35 | 0.14 | 2.0 |
| 17 | 0.275 | 1500 | 30 | 0.314 | 95 | 1.35 | 0.14 | 2.0 |
| 18 | 0.275 | 1600 | 30 | 0.314 | 95 | 1.35 | 0.14 | 2.0 |

Table 7 illustrates is a summary of catalyst particle size and composition for Examples 3-16.

| | | Chemical composition | | |
|---|---|---|---|---|
| Catalysts | D50 (µm) | Mg (wt %) | Ti (wt %) | Al (wt %) |
| 3 | 9.1 | 7.5 | 7.3 | 2.6 |
| 4 | 10.6 | 6.7 | 6.2 | 2.2 |
| 5 | 7.8 | 8.7 | 6.3 | 3.0 |
| 6 | 8.9 | 13.0 | 13.6 | 4.6 |
| 7 | 8.0 | 9.2 | 11.3 | 4.0 |
| 8 | 21.9 | 10.0 | 8.4 | 4.6 |
| 9 | 7.5 | 10.5 | 11.1 | 4.4 |
| 10 | 14.4 | 9.3 | 10.2 | 3.5 |
| 11 | 6.7 | 8.3 | 9.3 | 3.6 |
| 12 | 4.5 | 11.1 | 10.2 | 5.0 |
| 13 | 6.6 | 7.1 | 10.1 | 4.7 |
| 14 | 4.0 | 12.2 | 13.8 | 3.9 |
| 15 | 5.9 | 10.5 | 16.9 | 3.9 |
| 16 | 7.9 | 9.3 | 11.6 | 2.8 |
| 17 | 4.8 | 7.4 | 11.6 | 2.9 |
| 18 | 3.7 | 10.0 | 11.7 | 3.5 |

This is also a significant benefit to producing small particle size catalysts by using the catalyst preparation method B (FIG. 13B) over the catalyst preparation method A (FIG. 13A). As shown in FIG. 14, the smaller catalyst particle size range was obtained under similar shear rate conditions independently of the intermediate complex used in the Example 13-16 (catalyst preparation method B). In other words, much less energy input was required to produce smaller catalyst particle size in the catalyst preparation method B (FIG. 13B).

Example 19

Ethylene polymerization was performed in a one gallon reactor. The reactor was purged at 100° C. under nitrogen for one hour. At room temperature, the reactor is charged with 2.3 L of hexane and 230 mg of DEAC (diethyl aluminum). Then, 30 mg of catalyst in hexane slurry is added into the reactor. The reactor temperature was increased to 80° C. and then charged with ethylene to reach 120 psi. The pressure is kept constant with ethylene pressure until 360 g of ethylene is consumed. At the end of the hold, the reactor was vented and the polymer was recovered. The results are listed in Tables 8 and 9.

TABLE 8

Summary of the catalyst performance.

| Example | Polymerization time (min) | Catalyst[a] (mg) | Yield (g) | CE[c] ($kg_{PE} \cdot g_{Cat}^{-1} \cdot h^{-1}$) |
|---|---|---|---|---|
| 3 | 64 | 30[a] | 346 | 11 |
| 4 | 59 | 30[a] | 350 | 12 |
| 5 | 71 | 30[a] | 349 | 10 |
| 6 | 94 | 30[a] | 317 | 7 |
| 7 | 132 | 30[a] | 313 | 5 |
| 8 | 68 | 30[a] | 330 | 10 |
| 9 | 87 | 25[b] | 346 | 10 |
| 10 | 88 | 26[b] | 307 | 8 |
| 11 | 86 | 31[b] | 329 | 7 |
| 12 | 60 | 20[b] | 181 | 9 |
| 13 | 60 | 30[a] | 350 | 12 |
| 14 | 120 | 16[b] | 285 | 9 |
| 15 | 136 | 30[a] | 248 | 4 |
| 16 | 142 | 30[a] | 124 | 2 |
| 17 | 60 | 30[a] | 377 | 12 |
| 18 | 60 | 30[a] | 402 | 13 |

[a]Experimental catalyst amount is 30 mg;
[b]Determined by ICP-OES;
[c]CE is an abbreviation for Catalyst Activity in units of (kg of polymer)/g pre-catalyst/hour).

TABLE 9

Polymer properties

| Polymers from above using the materials of Example | BD (g/cm$^3$) | IV (dl/g) | MW (10$^{-6}$ g/mol) | D50 (µm) |
|---|---|---|---|---|
| 3 | 0.391 | 26.1 | 6.92 | 179.0 |
| 4 | 0.339 | 6.4 | 0.86 | 227.9 |
| 5 | 0.351 | 15.6 | 3.22 | 208.0 |
| 6 | 0.423 | 29.9 | 8.50 | 226.0 |
| 7 | 0.402 | 26.6 | 7.14 | 196.2 |
| 8 | 0.320 | 22.2 | 5.46 | 582.6 |
| 9 | 0.376 | 24.8 | 6.44 | 177.0 |
| 10 | 0.379 | 24.6 | 6.34 | 293.3 |
| 11 | 0.405 | 24.3 | 6.22 | 149.0 |
| 12 | 0.311 | 18.8 | 4.25 | 119.0 |
| 13 | 0.361 | n.d. | n.d. | 125.0 |
| 14 | 0.312 | 23.1 | 5.76 | 119.0 |
| 15 | 0.263 | 20.5 | 4.83 | 122.5 |
| 16 | 0.297 | 29.0 | 8.11 | n.d. |
| 17 | 0.227 | n.d. | n.d. | 111.0 |
| 18 | 0.307 | 21.1 | 5.03 | 107.0 |

Example 20

Figure 15A:
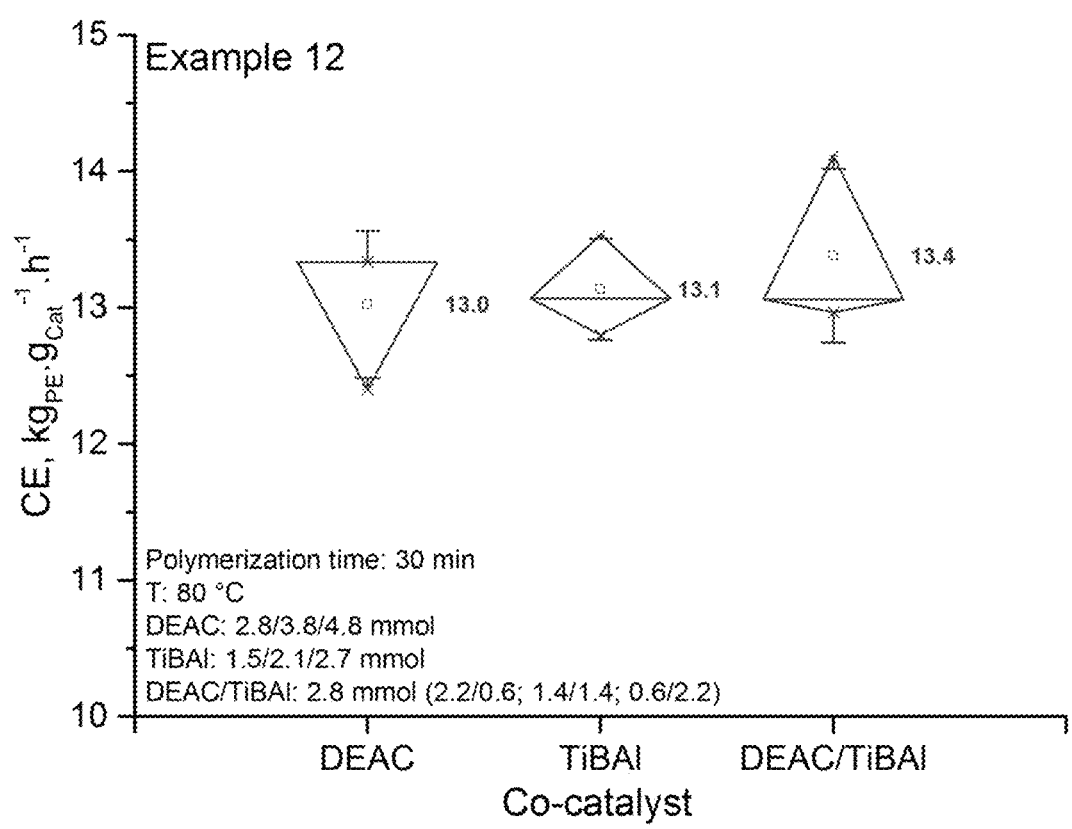
FIGS. 15A and 15B are plots of CE of Example 12 and 15 under different activation conditions, according to the polymerization conditions described in Example 20.
Figure 15B:
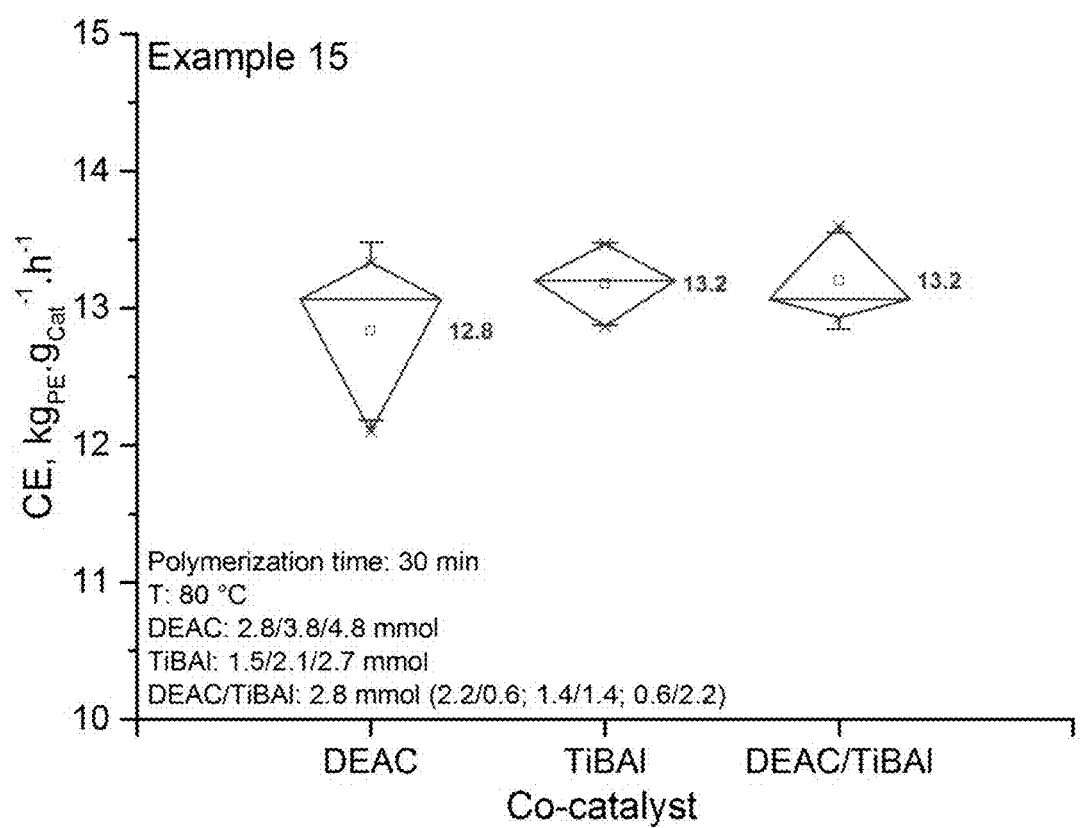

Polymerization reactions were carried under similar conditions to Example 18, however polymerization time was fixed to 30 min and pre-catalyst systems underwent different activation conditions, as shown in Table 10. In this case, the polymerization reactor was charged with different levels of DEAC, TiBA and the mixture of the both co-catalysts under different molar ratio. The results are also summarized in FIG. 15A-B.

TABLE 10

Summary of polymerization conditions and catalyst performance results.

| Pre-catalyst[a] | Co-catalyst Type | Co-catalyst (mmol) | $CE^c$ $(kg_{PE} \cdot g_{Cat}^{-1} \cdot h^{-1})$ | BD, $(g/cm^3)$ | MW, $(10^{-6} g/mol)$ | $D_{50}$, $(\mu m)$ |
|---|---|---|---|---|---|---|
| Example 12 | DEAC | 2.8 | 12.40 | 0.317 | 5.29 | 88 |
|  |  | 3.8 | 13.33 | 0.296 | 4.67 | 88 |
|  |  | 4.8 | 13.33 | 0.306 | 4.65 | 92 |
| Example 12 | TiBA | 1.5 | 13.53 | 0.271 | 4.04 | 104 |
|  |  | 2.1 | 13.07 | 0.282 | 4.21 | 98 |
|  |  | 2.7 | 12.80 | 0.276 | 3.71 | 98 |
| Example 16 | DEAC | 2.8 | 13.07 | 0.256 | 5.45 | 103 |
|  |  | 3.8 | 8.60 | 0.235 | 5.80 | 111 |
|  |  | 4.8 | 13.33 | 0.266 | 5.13 | 106 |
| Example 16 | TiBA | 1.5 | 12.87 | 0.272 | 3.67 | 106 |
|  |  | 2.1 | 13.47 | 0.262 | 3.60 | 105 |
|  |  | 2.7 | 13.20 | 0.246 | 3.45 | 107 |
| Example 12 | DEAC/TiBA | 2.2/0.6 | 12.97 | 0.280 | 4.85 | 98 |
|  |  | 1.4/1.4 | 13.06 | 0.285 | 5.95 | 94 |
|  |  | 0.6/2.2 | 14.11 | 0.270 | 4.63 | 102 |
| Example 16 | DEAC/TiBA | 2.2/0.6 | 13.07 | 0.261 | 3.45 | 89 |
|  |  | 1.4/1.4 | 13.60 | 0.268 | 3.98 | 113 |
|  |  | 0.6/2.2 | 12.93 | 0.276 | 4.97 | 97 |

[a]Target pre-catalyst feed was 30 mg.

Example 21

A general polymerization procedure was carried out in a reactor cell with a geometric volume of approximately 23 mL and a working volume of approximately 5.5 mL for the liquid phase equipped with magnetically coupled mechanical stirrer. The cell was initially purged under intermittent nitrogen flow at 90° C. to 140° C. for 8 hours. After then cooling to room temperature the cell was fitted with disposable 10 mL glass and stir paddles and the stir tops were then set back in the reactor system. The amount of dried heptane and 1-butene as co-monomer was then fed through a syringe pump to the reactor system with the presence of small amounts of alkyl aluminum as a scavenger. The system was then allowed to reach the set temperature and operating pressure with ethylene, which general working pressure was 120 psi. Under this condition, using a slurry needle system, the amount of pre-catalyst dispersed in heptane slurry (approx. 0.1 mg) was collected. A solution of alkyl aluminum, usually the same used as scavenger, in heptane was uptaken by the needle system before injected into the cell. The polymerization reaction starts under constant pressure by feeding ethylene and stirring (800 rpm), typically for 30 min. The reaction was quenched by over-pressurizing the system with dry air and the reactor was cooled to room temperature and vented. The glass cell was removed from the reactor, the solvent evaporated in a centrifugal evaporator, and the obtained polymer dried under vacuum overnight.

Figure 17:
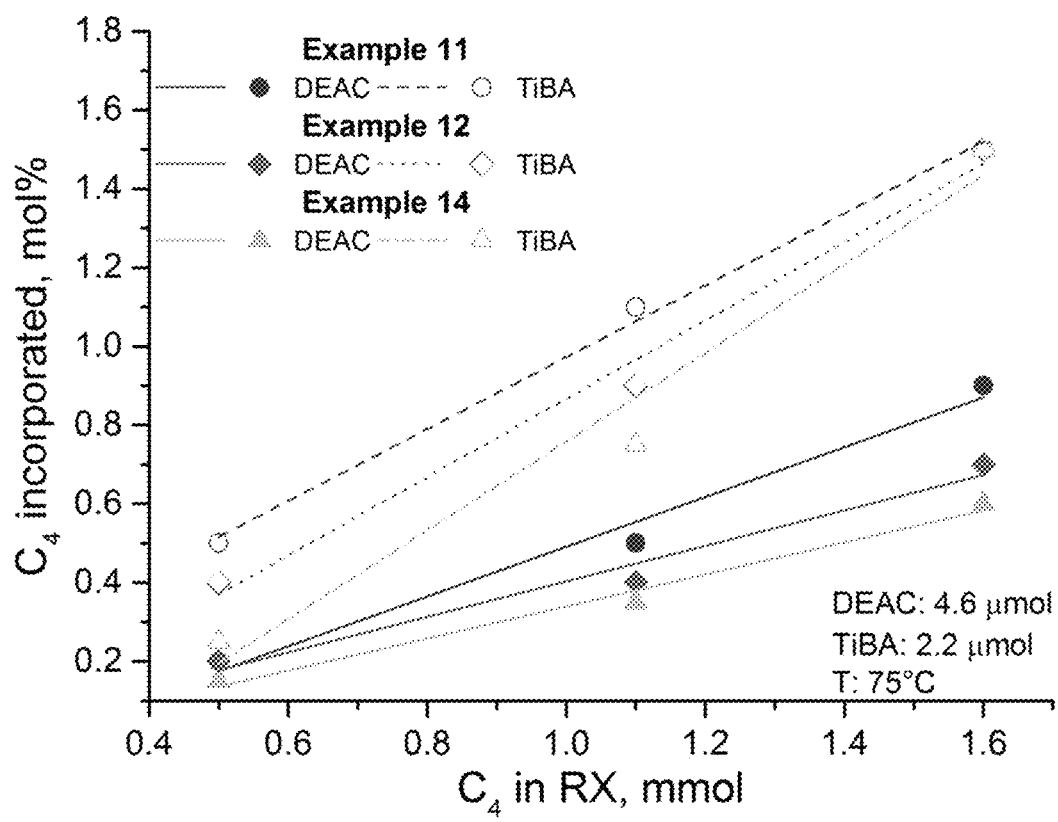
FIG. 17 is a graph of 1-butene incorporation with various catalyst systems under different polymerization conditions.

The polymerization results are summarized in Table 11 for the tested catalyst system. It is important to notice that, as shown in FIG. 17, a higher incorporation of 1-butene was observed with the catalyst systems using TiBA as co-catalyst.

TABLE 11

Summary of polymerization conditions.

| Pre-catalyst[a] | Co-catalyst Type | 1-Butene (mmol) | $CE^c$ $(kg_{PE} \cdot gC_{at}^{-1} \cdot h^{-1})$ |
|---|---|---|---|
| Example 11 | DEAC | 0.5 | 10.4 |
|  |  | 1.1 | 11.3 |
|  |  | 1.6 | 11.3 |

TABLE 11-continued

Summary of polymerization conditions.

| Pre-catalyst[a] | Co-catalyst Type | 1-Butene (mmol) | $CE^c$ $(kg_{PE} \cdot gC_{at}^{-1} \cdot h^{-1})$ |
|---|---|---|---|
| Example 11 | TiBA | 0.6 | 28.1 |
|  |  | 1.1 | 9.7 |
|  |  | 1.6 | 6.2 |
| Example 12 | DEAC | 0.5 | 13.0 |
|  |  | 1.1 | 10.5 |
|  |  | 1.6 | 5.8 |
| Example 12 | TiBA | 0.5 | 25.2 |
|  |  | 1.1 | 9.6 |
|  |  | 1.6 | 3.0 |
| Example 14 | DEAC | 0.5 | 8.7 |
|  |  | 1.1 | 5.4 |
|  |  | 1.6 | 2.8 |
| Example 14 | TiBA | 0.5 | 19.4 |
|  |  | 1.1 | 14.0 |
|  |  | 1.6 | 18.8 |

Para. 1. A complex of Formula I:

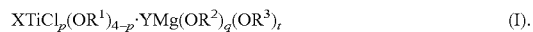

$$XTiCl_p(OR^1)_{4-p} \cdot YMg(OR^2)_q(OR^3)_t \qquad (I).$$

wherein: a molar ratio of X to Y (X/Y) is from 0.2 to 5.0; p is 0 or 1; 0<q<2; 0<t<2; the sum of q and t is 2; $R^1$, $R^2$, and $R^3$ are each independently a linear or branched alkyl, a linear or branched heteroalkyl, a cycloalkyl, a substituted cycloalkyl, a substituted heterocycloalkyl, a substituted aryl, or a (heteroaryl)alkyl; and $R^2$ is not the same as $R^3$.

Para. 2. The complex of Para. 1, wherein $R^1$ is a $C_3$-$C_6$ alkyl, $R^2$ is $C_2$-$C_4$ alkyl, and $R^3$ is a $C_3$-$C_6$ alkyl.

Para. 3. The complex of Para. 1 or 2, wherein $R^1$ is n-butyl, $R^2$ is ethyl, and $R^3$ is n-butyl.

Para. 4. The complex of any one of Paras. 1-3, wherein p is 1.

Para. The complex of any one of Paras. 1-4, wherein q is from about 0.5 to 1.5 and t is from about 0.5 to 1.5.

Para. 6. The complex of any one of Paras. 1-5, wherein X is 0.2 to 0.5 and Y is 0.6 to 0.8.

Para. 7. The complex of any one of Paras. 1-6, wherein the molar ratio of X:Y is from 1 to 3.

Para. 8. The complex of any one of Paras. 1-7, wherein the molar ratio of X:Y is about 2.

Para. 9. The complex of any one of Paras. 1-8 that exhibits a $^{13}$C NMR spectra having an alkoxide resonance from 50 ppm to 80 ppm versus residual solvent signal of deuterated toluene-$d_8$.

Para. 10. The complex of any one of Paras. 1-9 that exhibits a $^{13}$C NMR spectra having an aryloxide resonance from 40 ppm to 120 ppm versus residual solvent signal of deuterated toluene-$d_8$.

Para. 11. The complex of any one of Paras. 1-10, wherein weight residue obtained by thermal gravimetric analysis (TGA) is from 20 wt % to 35 wt %.

Para. 12. The complex of any one of Paras. 1-11 which exhibits a Fourier Transform Infrared C—H stretching vibration at a wavenumber from 2500 cm$^{-1}$ to 4000 cm$^{-1}$.

Para. 13. A colloidal suspension comprising an organic solvent and a complex of Formula I:

$$XTiCl_p(OR^1)_{4-p} \cdot YMg(OR^2)_q(OR^3)_t \quad (I).$$

wherein: a molar ratio of X to Y (X/Y) is from 0.2 to 5.0; p is 0 or 1; 0<q<2; 0<t<2; the sum of q and t is 2; $R^1$, $R^2$, and $R^3$ are each independently a linear or branched alkyl, a linear or branched heteroalkyl, a cycloalkyl, a substituted cycloalkyl, a substituted heterocycloalkyl, a substituted aryl, or a (heteroaryl)alkyl; and $R^2$ is not the same as $R^3$.

Para. 14. The colloidal suspension of Para. 13, wherein the organic solvent comprises an alkane, aromatic, or a mixture of any two or more thereof.

Para. 15. The colloidal suspension of Para. 13 or 14, wherein the organic solvent comprises n-hexane, n-pentane, cyclohexane, toluene, benzene, benzine, o-cresol, p-cresol, m-cresol, 1,2-dimethylbenzene, 1,3-dimethylbenzene, 1,4-dimethylbenzene, ethylbenzene, cumine, trichloroethylene, trichlorobenzene, o-dichlorobenzene, or a mixture of any two or more thereof.

Para. 16. The colloidal suspension of any one of Paras. 13-15, wherein the complex exhibits a multimodal domain size of a dispersed phase.

Para. 17. The colloidal suspension of Para. 16, wherein the concentration of the Ti and Mg is from 1×10$^{-5}$ M to 2.0 M, as determined by inductively coupled plasma-optical emission spectrometry (ICP-OES).

Para. 18. The colloidal suspension of Para. 16 or 17, wherein the multimodal domain size exhibits a first peak with a domain size mean from 1 nm to 10 nm in diameter, and a second peak with a domain size mean from 250 nm to 350 nm in diameter at 20° C.

Para. 19. The colloidal suspension of Para. 16, 17, or 18, wherein the multimodal domain size exhibits a first peak with a domain size mean from 250 nm to 400 nm in diameter, and a second peak with a domain size mean from 4000 nm to 6000 nm in diameter at 50° C.

Para. 20. The colloidal suspension of Para. 16, 17, 18, or 19, wherein the multimodal domain size exhibits a first peak when measured by Focus Beam Reflectance Measurement (FBRM) with a cord length mean from 1 μm to 10 μm, when measured from −30° C. to 60° C.

Para. 21. A solid pre-catalyst system comprising solid particles of a composite of a reaction product of a halogenated compound and a colloidal suspension of a complex of Formula I:

$$XTiCl_p(OR^1)_{4-p} \cdot YMg(OR^2)_q(OR^3)_t \quad (I).$$

wherein: a molar ratio of X to Y (X/Y) is from 0.2 to 5.0; p is 0 or 1; 0<q<2; 0<t<2; the sum of q and t is 2; $R^1$, $R^2$, and $R^3$ are each independently a linear or branched alkyl, a linear or branched heteroalkyl, a cycloalkyl, a substituted cycloalkyl, a substituted heterocycloalkyl, a substituted aryl, or a (heteroaryl)alkyl; and $R^2$ is not the same as $R^3$.

Para. 22. The solid pre-catalyst system of Para. 21, wherein the halogenated compound comprises diethyl aluminum chloride (DEAC), ethylaluminum sesquichloride (EASC), ethyl aluminum dichloride (EADC), titanium tetrachloride (TiCl$_4$), silicon tetrachloride (SiCl$_4$) or a mixture of any two or more thereof.

Para. 23. The solid pre-catalyst system of Para. 21 or 22, wherein the Ti is present from 0.5 wt % to 30 wt %.

Para. 24. The solid pre-catalyst system of any one of Paras. 21-23, wherein the Mg is present from 1 wt % to 20 wt %.

Para. 25. The solid pre-catalyst system of any one of Paras. 21-24, wherein the Al is present from 1 wt % to 20 wt %.

Para. 26. The solid pre-catalyst system of any one of Paras. 21-25, wherein the solid particles exhibit a $D_{50}$ from 1 μm to 30 μm.

Para. 27. The solid pre-catalyst system of any one of Paras. 21-26 further contacting with a reducing agent.

Para. 28. A method of polymerizing or co-polymerizing an olefin monomer, the method comprising: contacting a solid pre-catalyst system comprising solid particles of a composite of a reaction product of a halogenated compound and a colloidal suspension of a complex of Formula I with a reducing agent and the olefin monomer:

$$XTiCl_p(OR^1)_{4-p} \cdot YMg(OR^2)_q(OR^3)_t \quad (I)$$

wherein: a molar ratio of X to Y (X/Y) is from 0.2 to 5.0; p is 0 or 1; 0<q<2; 0<t<2; the sum of q and t is 2; $R^1$, $R^2$, and $R^3$ are each independently a linear or branched alkyl, a linear or branched heteroalkyl, a cycloalkyl, a substituted cycloalkyl, a substituted heterocycloalkyl, a substituted aryl, or a (heteroaryl)alkyl; and $R^2$ is not the same as $R^3$.

Para. 29. The method of Para. 28, wherein the reducing agent comprises diethyl aluminum chloride (DEAC), triethyl aluminum (TEA), ethylaluminum sesquichloride (EASC), ethyl aluminum dichloride (EADC), triisobutyl aluminum (TiBA), trimethyl aluminum (TMA), methylaluminoxane (MAO), or a mixture of any two or more thereof.

Para. 30. The method of Para. 28 or 29, wherein the olefin monomer comprises ethylene, propylene, 1-butene, 4-methyl-1-pentene, 1-hexene, 1-octene, or a mixture of any two or more thereof.

Para. 31. The method of any one of Paras. 28-30, wherein the solid catalyst system exhibits a catalyst efficiency (CE) of greater than 2 $kg_{PE} \cdot g_{Cat}^{-1} \cdot h^{-1}$.

Para. 32. The method of any one of Paras. 28-31, wherein the olefin is ethylene, and the method further comprises collecting polyethylene exhibiting an intrinsic viscosity of greater than 1.0 dl/g.

Para. 33. A method of forming a solid pre-catalyst system composition, the method comprising: contacting simultaneously a halogenated compound and a colloidal suspension of a complex of Formula I into an inert liquid medium to form the solid pre-catalyst system:

$$XTiCl_p(OR^1)_{4-p} \cdot YMg(OR^2)_q(OR^3)_t \quad (I).$$

wherein: a molar ratio of X to Y (X/Y) is from 0.2 to 5.0; p is 0 or 1; 0<q<2; 0<t<2; the sum of q and t is 2; $R^1$, $R^2$, and $R^3$ are each independently a linear or branched alkyl, a linear or branched heteroalkyl, a cycloalkyl, a substituted cycloalkyl, a substituted heterocycloalkyl, a substituted aryl, or a (heteroaryl)alkyl; and $R^2$ is not the same as $R^3$.

Para. 34. The method of Para. 33, wherein the organic solvent comprises an alkane, aromatic, or a mixture of any two or more thereof.

Para. 35. The method of Para. 33 or 34, wherein the organic solvent comprises n-hexane, n-pentane, cyclohexane, toluene, benzene, benzine, o-cresol, p-cresol, m-cresol, 1,2-dimethylbenzene, 1,3-dimethylbenzene, 1,4-dimethylbenzene, ethylbenzene, cumine, trichloroethylene, trichlorobenzene, o-dichlorobenzene, or a mixture of any two or more thereof.

Para. 36. The method of any one of Paras. 33-35, wherein the complex of Formula I exhibits a multimodal domain size of a dispersed phase.

Para. 37. The method of any one of Paras. 33-36, wherein the concentration of the Ti and Mg is from $1\times10^{-5}$M to 2.0 M, as determined by inductively coupled plasma-atomic emission spectrometry (ICP-OES).

Para. 38. The method of any one of Paras. 36-37, wherein the multimodal domain size exhibits a first peak with a domain size mean from 250 nm to 400 nm in diameter, and a second peak with a domain size mean from 4000 nm to 6000 nm in diameter at 50° C.

Para. 39. The method of any one of Paras. 33-38, wherein the halogenated compound comprises diethyl aluminum chloride (DEAC), ethylaluminum sesquichloride (EASC), ethyl aluminum dichloride (EADC), titanium tetrachloride ($TiCl_4$), silicon tetrachloride ($SiCl_4$) or a mixture of any two or more thereof.

Para. 40. The method of any one of Paras. 33-39, wherein the halogenated compound is diluted in an organic solvent at a concentration of greater than 5 wt %.

Para. 41. The method of any one of Paras. 33-40, wherein the inert liquid medium comprises an alkane, aromatic, or a mixture of any two or more thereof.

Para. 42. The method of any one of Paras. 33-41, wherein the inert liquid medium comprises n-hexane, n-pentane, cyclohexane, toluene, benzene, benzine, o-cresol, p-cresol, m-cresol, 1,2-dimethylbenzene, 1,3-dimethylbenzene, 1,4-dimethylbenzene, ethylbenzene, cumine, trichloroethylene, trichlorobenzene, o-dichlorobenzene, mineral oil, or a mixture of any two or more thereof.

Para. 43. The method of any one of Paras. 33-42, wherein a temperature of the inert liquid medium is from −40° C. to +60° C.

Para. 44. The method of any one of Paras. 33-43, wherein the contacting comprises stirring at 50 rpm to 1800 rpm.

Para. 45. The method of any one of Paras. 33-44, wherein the contacting comprises simultaneous addition of the halogenated compound(s) and the colloidal suspension of a complex of Formula I is at a constant chloride to $-OR^x$ molar ratio, where $R^x$ corresponds to the collective $R^1$, $R^2$, and $R^3$. 46. The method of any one of Paras. 33-45, wherein the chloride to $-OR^x$ molar ratio is from 1 to 10.

Para. 47. The method of any one of Paras. 33-46, wherein the solid pre-catalyst system comprises Ti from 0.5 wt % to 30 wt %.

Para. 48. The method of any one of Paras. 33-47, wherein the solid pre-catalyst system comprises Mg from 1 wt % to 20 wt %.

Para. 49. The method of any one of Paras. 33-48, wherein the solid pre-catalyst system comprises Al from 1 wt % to 20 wt %.

Para. 50. The method of any one of Paras. 33-49, wherein the solid pre-catalyst system comprises pre-catalyst particles having a $D_{50}$ from 1 μm to 15 μm.

Para. 51. The method of any one of Paras. 33-50, wherein the solid pre-catalyst system is further contacted with a reducing agent.

Para. 52. The method of Para. 51, wherein the reducing agent comprises diethyl aluminum chloride (DEAC), triethyl aluminum (TEA), ethylaluminum sesquichloride (EASC), ethyl aluminum dichloride (EADC), triisobutyl aluminum (TiBA), trimethyl aluminum (TMA), methylaluminoxane (MAO), or a mixture of any two or more thereof.

Para. 53. The method of any one of Paras. 33-52, wherein the solid catalyst system is configured to polymerize, or co-polymerize, an olefin monomer.

Para. 54. The method of any one of Paras. 33-53, wherein the olefin monomer comprises ethylene, propylene, 1-butene, 4-methyl-1-pentene, 1-hexene, 1-octene, or a mixture of any two or more thereof.

Para. 55. The method of any one of Paras. 33-54, wherein the solid catalyst system exhibits an olefinic polymerization catalyst efficiency (CE) of greater than 2 $kg_{PE} \cdot g_{Cat}^{-1} \cdot h^{-1}$.

Para. 56. The method of any one of Paras. 33-55, wherein the olefin comprises ethylene, the method further comprises collecting polyethylene exhibiting an intrinsic viscosity of greater than 1.0 dl/g.

While certain embodiments have been illustrated and described, it should be understood that changes and modifications may be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations may be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like, include the number recited and refer to ranges which may be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A complex of Formula I:

$$XTiCl_p(OR^1)_{4-p} \cdot YMg(OR^2)_q(OR^3)_t \quad (I)$$

wherein:
a molar ratio of X to Y (X/Y) is from 0.2 to 5.0;
p is 0 or 1;
0<q<2;
0<t<2;
the sum of q and t is 2;
$R^1$, $R^2$, and $R^3$ are each independently a linear or branched alkyl, a linear or branched heteroalkyl, a cycloalkyl, a substituted cycloalkyl, a substituted heterocycloalkyl, a substituted aryl, or a (heteroaryl) alkyl; and
$R^2$ is not the same as $R^3$.

2. The complex of claim 1, wherein $R^1$ is a $C_3$-$C_6$ alkyl, $R^2$ is $C_2$-$C_4$ alkyl, and $R^3$ is a $C_3$-$C_6$ alkyl.

3. The complex of claim 1, wherein $R^1$ is n-butyl, $R^2$ is ethyl, and $R^3$ is n-butyl.

4. The complex of claim 1, wherein q is from about 0.5 to 1.5 and t is from about 0.5 to 1.5.

5. The complex of claim 1, wherein X is 0.2 to 0.5 and Y is 0.6 to 0.8.

6. The complex of claim 1, wherein the molar ratio of X:Y is from 1 to 3.

7. The complex of claim 1, wherein the molar ratio of X:Y is about 2.

8. The complex of claim 1 that exhibits a $^{13}$C NMR spectrum having an alkoxide resonance from 50 ppm to 80 ppm versus residual solvent signal of deuterated toluene-$d_8$.

9. The complex of claim 1, wherein weight residue obtained by thermal gravimetric analysis (TGA) is from 20 wt % to 35 wt %.

10. The complex of claim 1 which exhibits a Fourier transform infrared C—H stretching vibration at a wavenumber from 2500 cm$^{-1}$ to 4000 cm$^{-1}$.

11. The complex of claim 1, wherein p is 1.

12. A colloidal suspension comprising an organic solvent and a complex of Formula I:

$$XTiCl_p(OR^1)_{4-p} \cdot YMg(OR^2)_q(OR^3)_t \quad (I)$$

wherein:
a molar ratio of X to Y (X/Y) is from 0.2 to 5.0;
p is 0 or 1;
0<q<2;
0<t<2;
the sum of q and t is 2;
$R^1$, $R^2$, and $R^3$ are each independently a linear or branched alkyl, a linear or branched heteroalkyl, a cycloalkyl, a substituted cycloalkyl, a substituted heterocycloalkyl, a substituted aryl, or a (heteroaryl) alkyl; and
$R^2$ is not the same as $R^3$.

13. The colloidal suspension of claim 12, wherein the organic solvent comprises an alkane, aromatic, or a mixture of any two or more thereof.

14. The colloidal suspension of claim 12, wherein the organic solvent comprises n-hexane, n-pentane, cyclohexane, toluene, benzene, benzine, o-cresol, p-cresol, m-cresol, 1,2-dimethylbenzene, 1,3-dimethylbenzene, 1,4-dimethylbenzene, ethylbenzene, cumene, trichloroethylene, trichlorobenzene, o-dichlorobenzene, or a mixture of any two or more thereof.

15. The colloidal suspension of claim 12, wherein a concentration of Ti and Mg is from $1\times10^{-5}$M to 2.0 M, as determined by inductively coupled plasma-optical emission spectrometry (ICP-OES).

16. The colloidal suspension of claim 12, wherein the complex exhibits a multimodal domain size of a dispersed phase.

17. The colloidal suspension of claim 16, wherein the multimodal domain size exhibits a first peak with a domain size mean from 1 nm to 10 nm in diameter, and a second peak with a domain size mean from 250 nm to 350 nm in diameter at 20° C.

18. The colloidal suspension of claim 16, wherein the multimodal domain size exhibits a first peak with a domain size mean from 250 nm to 400 nm in diameter, and a second peak with a domain size mean from 4000 nm to 6000 nm in diameter at 50° C.

19. A method of polymerizing or co-polymerizing an olefin monomer, the method comprising:
contacting a solid pre-catalyst system comprising solid particles of a composite of a reaction product of a halogenated compound and a colloidal suspension of a complex of Formula I with a reducing agent and the olefin monomer:

$$XTiCl_p(OR^1)_{4-p} \cdot YMg(OR^2)_q(OR^3)_t \quad (I)$$

wherein:
a molar ratio of X to Y (X/Y) is from 0.2 to 5.0;
p is 0 or 1;
0<q<2;
0<t<2;
the sum of q and t is 2;
$R^1$, $R^2$, and $R^3$ are each independently a linear or branched alkyl, a linear or branched heteroalkyl, a cycloalkyl, a substituted cycloalkyl, a substituted heterocycloalkyl, a substituted aryl, or a (heteroaryl) alkyl; and
$R^2$ is not the same as $R^3$.

20. The method of claim 19, wherein the reducing agent comprises diethyl aluminum chloride (DEAC), triethyl aluminum (TEA), ethylaluminum sesquichloride (EASC), ethyl aluminum dichloride (EADC), triisobutyl aluminum (TiBA), trimethyl aluminum (TMA), methylaluminoxane (MAO), or a mixture of any two or more thereof.

* * * * *